United States Patent
Nakatsugawa

(10) Patent No.: US 8,271,010 B2
(45) Date of Patent: Sep. 18, 2012

(54) WIRELESS COMMUNICATION TERMINAL AND MANAGEMENT DEVICE IN A WIRELESS COMMUNICATION SYSTEM AND METHOD THEREOF

(75) Inventor: Keiichi Nakatsugawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 307 days.

(21) Appl. No.: 12/725,837

(22) Filed: Mar. 17, 2010

(65) Prior Publication Data

US 2010/0248768 A1    Sep. 30, 2010

(30) Foreign Application Priority Data

Mar. 25, 2009    (JP) .................................. 2009-74803

(51) Int. Cl.
    *H04B 7/00*    (2006.01)
(52) U.S. Cl. .................. 455/509; 455/67.11; 455/515; 455/458
(58) Field of Classification Search .................. 455/73, 455/509, 561, 67.11, 425, 424, 450, 451, 455/425.2, 440, 68, 414.1, 422.1, 456.3, 455/41.2, 420, 418, 456.4, 426.1, 515, 458; 709/227, 219, 217; 370/328, 438, 254
    See application file for complete search history.

(56) References Cited

U.S. PATENT DOCUMENTS

| | | | | |
|---|---|---|---|---|
| 7,577,447 | B2 * | 8/2009 | Itoh et al. | 455/456.3 |
| 2005/0030918 | A1 * | 2/2005 | Motegi et al. | 370/328 |
| 2006/0019678 | A1 * | 1/2006 | Itoh et al. | 455/456.4 |
| 2006/0031042 | A1 * | 2/2006 | Ogura et al. | 702/184 |
| 2007/0078951 | A1 * | 4/2007 | Murai et al. | 709/217 |
| 2007/0143448 | A1 * | 6/2007 | Yi | 709/219 |
| 2008/0311899 | A1 * | 12/2008 | Moriwaki et al. | 455/422.1 |
| 2010/0115106 | A1 * | 5/2010 | Moriwaki et al. | 709/227 |
| 2010/0214952 | A1 * | 8/2010 | Gallagher et al. | 370/254 |
| 2010/0248705 | A1 * | 9/2010 | Okita et al. | 455/418 |

FOREIGN PATENT DOCUMENTS

| | | |
|---|---|---|
| JP | 2004134904 | 4/2004 |
| JP | 2005026991 | 1/2005 |

OTHER PUBLICATIONS

IEEE Std 802.16-2004 IEEE Standard for Local and metropolitan area networks Part 16: Air Interface for Fixed Broadband Wireless Access Systems IEEE Computer Society and the IEEE Microwave Theory and Techniques Society dated Oct. 1, 2004.
IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1 IEEE Std 802.16e-2005 and IEEE Std 802.16-2004.

* cited by examiner

*Primary Examiner* — Tan Trinh
(74) *Attorney, Agent, or Firm* — Murphy & King, P.C.

(57) ABSTRACT

A management device in a wireless communication system including a first communication terminal, a second communication terminal, a base station, includes a storage unit to store information related to an operation state of the second communication terminal associated with the first communication terminal as a communication counterpart, and a control unit that identifies the operation state of the associated second terminal based on the information stored in the storage unit, and changes an intermittent reception period of the first communication terminal to be longer than an existing period, based on the state of the second communication terminal.

10 Claims, 27 Drawing Sheets

FIG.15

| TERMINAL | STATE | PAGING GROUP | ASSOCIATED TERMINAL | PAGING CYCLE | FLAG |
|---|---|---|---|---|---|
| FIRST TERMINAL | IDLE | 1 | SECOND TERMINAL | SECOND PAGING CYCLE ↓ FIRST PAGING CYCLE | — |
| SECOND TERMINAL | IDLE ↓ NORMAL | 2 | — | FIRST PAGING CYCLE ↓ N/A | FIRST TERMINAL |

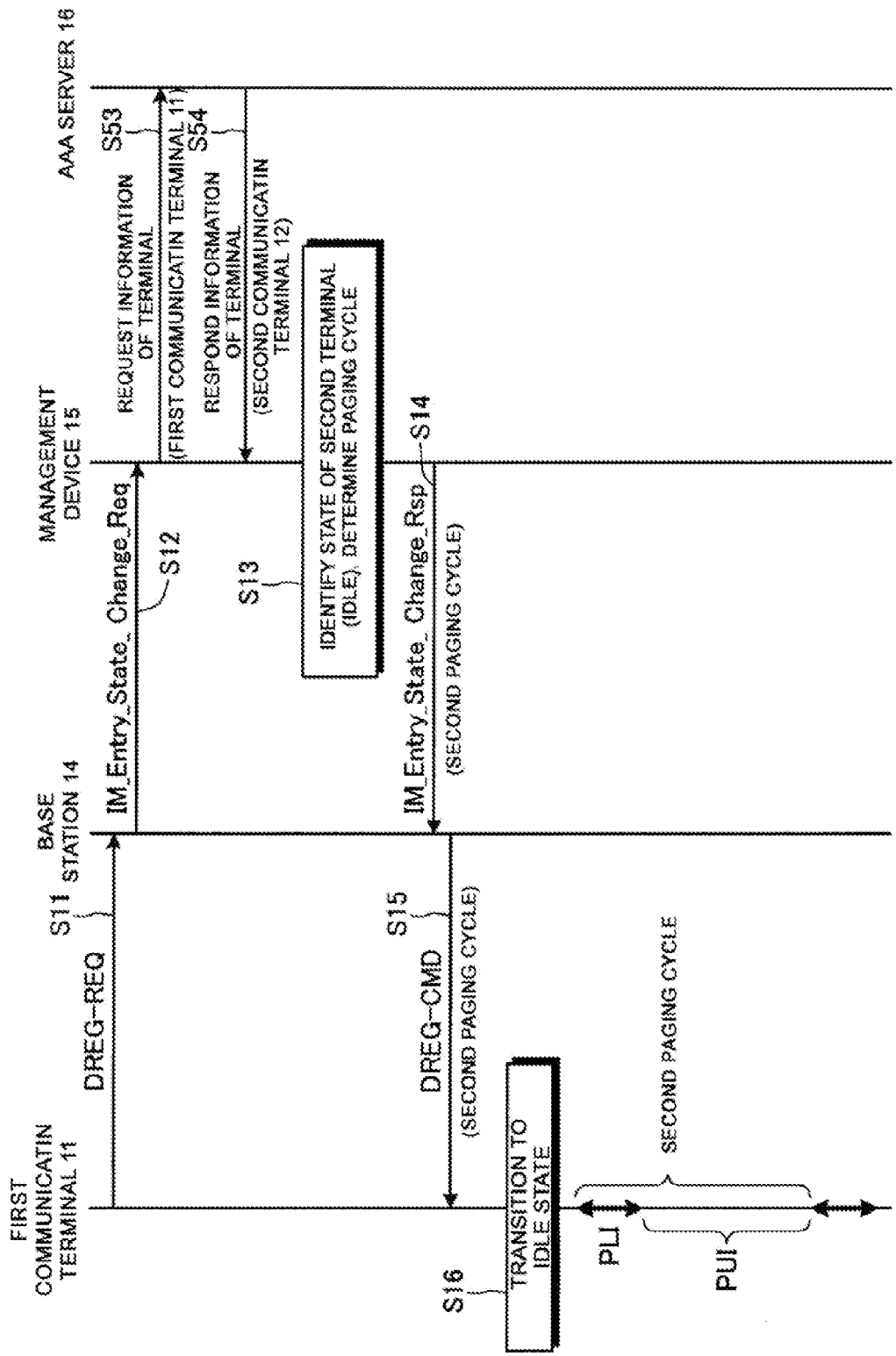

WIRELESS COMMUNICATION TERMINAL AND MANAGEMENT DEVICE IN A WIRELESS COMMUNICATION SYSTEM AND METHOD THEREOF

CROSS-REFERENCE TO RELATED APPLICATIONS

This application is based upon and claims the benefit of priority of the prior Japanese Patent Application No. 2009-074803, filed on Mar. 25, 2009, the entire contents of which are incorporated herein by reference.

FIELD

The embodiments discussed herein are related to a wireless communication device and a management device in a wireless communication system and a method thereof.

BACKGROUND

It has been known that a wireless communication terminal in a wireless communication system performs an intermittent receiving operation after turning into an idle state when there is no communication by the communication terminal. For example, a base station in a conventional wireless communication system assigns a first instruction information to a notification channel to notify the wireless communication terminal whether the wireless communication terminal should receive the notification channel or not, assigns a second instruction information to a paging channel to notify the communication terminal whether there is any paging information or not, and intermittently transmits the notification channel and the paging channel over a control channel. See, e.g., Japanese Laid-open Patent Publication No. 2005-26991. Further, a battery saving method has been known where a setting time for an intermittent reception period is extended twice of an original value when there is no reception for more than a predetermined receiving time interval. See, e.g., Japanese Laid-open Patent Publication No. 2004-134904.

SUMMARY

According to an aspect of the invention, a management device in a wireless communication system including a first communication terminal and a second communication terminal associated with the first communication terminal as a communication counterpart includes a storage unit that stores information related to the operation state of the associated second communication terminal, and a control unit that performs a control operation to identify the state of the associated second communication terminal in response to a request from the first communication terminal, based on the information stored in the storage unit, and changes an intermittent reception period of the first communication terminal to be longer than an existing period set prior to the request, based on the state of the associated second communication terminal.

The objects and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 15 is a table describing a management information in accordance with the third embodiment of the present invention;

FIG. 27 illustrates a sequence diagram of a wireless communication system in accordance with the eighth embodiment of the present invention.

Figure 1:
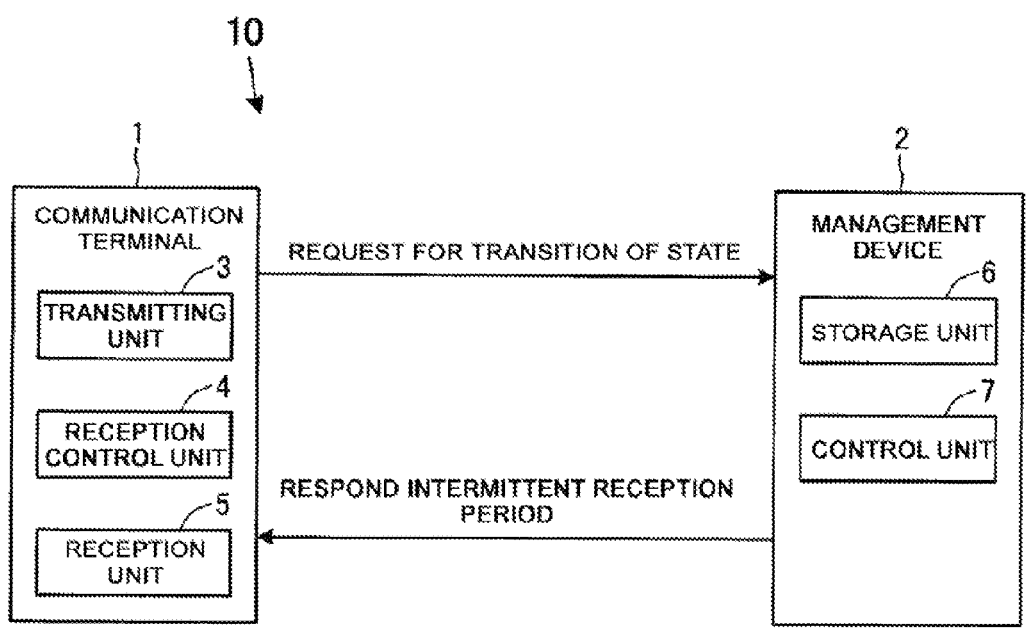
FIG. 1 depicts a block diagram of a wireless communication system in accordance with the first embodiment of the present invention.

It is to be understood that the drawings are for illustration only and are not limiting.

DESCRIPTION OF EMBODIMENTS

A communication terminal in a wireless communication system monitors whether an incoming call is received by intermittently checking a reception signal while the communication terminal is in an idle state. When the terminal communicates with only a limited number of counterpart terminals, and the counterpart terminals are in an idle state, the possibility that an incoming call is received at the terminal is low. However, when a checking period for the incoming calls is set equally regardless of whether the counterpart terminals are in an idle state or in a normal state (i.e., a state where the terminal is readily available for communication), the battery power may be wasted in the terminal by, e.g., unnecessarily checking the reception signal frequently in the idle state.

One of the objects of the present invention is directed to reducing the power consumption of the communication terminal. The foregoing and other objects, features and advantages of the invention will be apparent from the following detailed description taken in conjunction with the accompanying drawings.

Embodiments of the present invention are described below with reference to the accompanying drawings. It is noted that like numerals in the drawings may represent like elements throughout the specification and redundant explanations for the similar components and operations may be omitted. It is also noted that terms such as a communication device, a communication terminal and a terminal may refer to a handheld communication device (e.g., a cellular phone) in the wireless communication system carried by a user.

First Embodiment

Configuration Example of Wireless Communication System

FIG. 1 depicts a block diagram of a wireless communication system 10 in accordance with a first embodiment. As illustrated in FIG. 1, the wireless communication system includes a communication terminal 1 and a management device 2. It is assumed that a secondary communication terminal, not illustrated in FIG. 1, may be associated with the communication terminal 1 as a communication counterpart. However, a third communication terminal, not illustrated in FIG. 1, that is not associated with the communication terminal 1 as a communication counterpart may also exist.

It is noted that information such as an ID and an operation state of the associated communication terminal associated with the communication terminal 1 as a communication counterpart may be stored either in the communication terminal 1, the management device 2 or another device (not illustrated in FIG. 1). In either case, the management device 2 may acquire the relevant information of the associated communication counterpart by making an inquiry to a device that stores the relevant information. If the management device 2 itself stores the relevant information of the associated communication terminal, the management device may readily identify the associated communication terminal by simply reading out the stored information. In this first embodiment, it is assumed that the management device 2 itself has the relevant information of the associated communication terminal.

Referring to FIG. 1, the communication terminal 1 includes a transmitting unit (transmitter) 3, a reception control unit (controller) 4 and a reception unit (receiver) 5. The transmitting unit 3 of the communication terminal 1 transmits a transition request to the management device 2 for a transition from a first operation state (e.g., a normal communication state readily available for a communication) to a second operation state (e.g., an idle state). The reception unit 5 receives a response from the management device 2 sent in response to the transition request from the communication terminal 1. The response message may include, e.g., an intermittent reception period at the communication terminal 1 determined by the management device 2 according to the state of the associated communication terminal. The intermittent reception period is a reception period by which the communication terminal 1 conducts an intermittent reception operation. The reception control unit 4 of the communication terminal 1 performs a control operation to change the intermittent reception period of the reception unit 5 to be longer than an existing period set prior to the transition request, based on the received information by the reception unit 5. For example, the reception control unit 4 changes the intermittent reception period from a first period (T1) to a second period (T2) so that T1<T2, if the received information indicates that the state of the associated communication terminal is in an idle state.

The management device 2 includes a storage unit 6 and a control unit 7. The storage unit 6 may store information related to the state of the communication terminals. In response to a transition request from the communication terminal 1 requesting a transition from a first operation state (e.g., a normal state) to a second operation state (e.g., an idle state), the control unit 7 may verify the state of an associated communication terminal associated with the communication terminal 1 as a communication counterpart based on the information stored at the storage unit 6. The control unit 7, based on the verified state of the associated communication terminal, makes a decision as to whether the intermittent reception period of the communication terminal 1 should be changed either to a first period or to a second period longer than the first period. The determined period is then sent to the communication terminal 1 as a response for the transition request from the communication terminal 1. For example, if it is determined by the management device 2 that the associated communication terminal is in an idle state, the management device may send a response to the communication terminal 1 indicating that the intermittent reception period may be set as a second period thereby allowing the communication terminal 1 to check the reception signal less frequently. If, however, the management device 2 determines that the associated communication terminal is in a normal state, a response may be sent to the communication terminal 1 indicating that the intermittent reception period should be maintained as the first period set prior to the transition request.

Operation of Wireless Communication System

Figure 2:
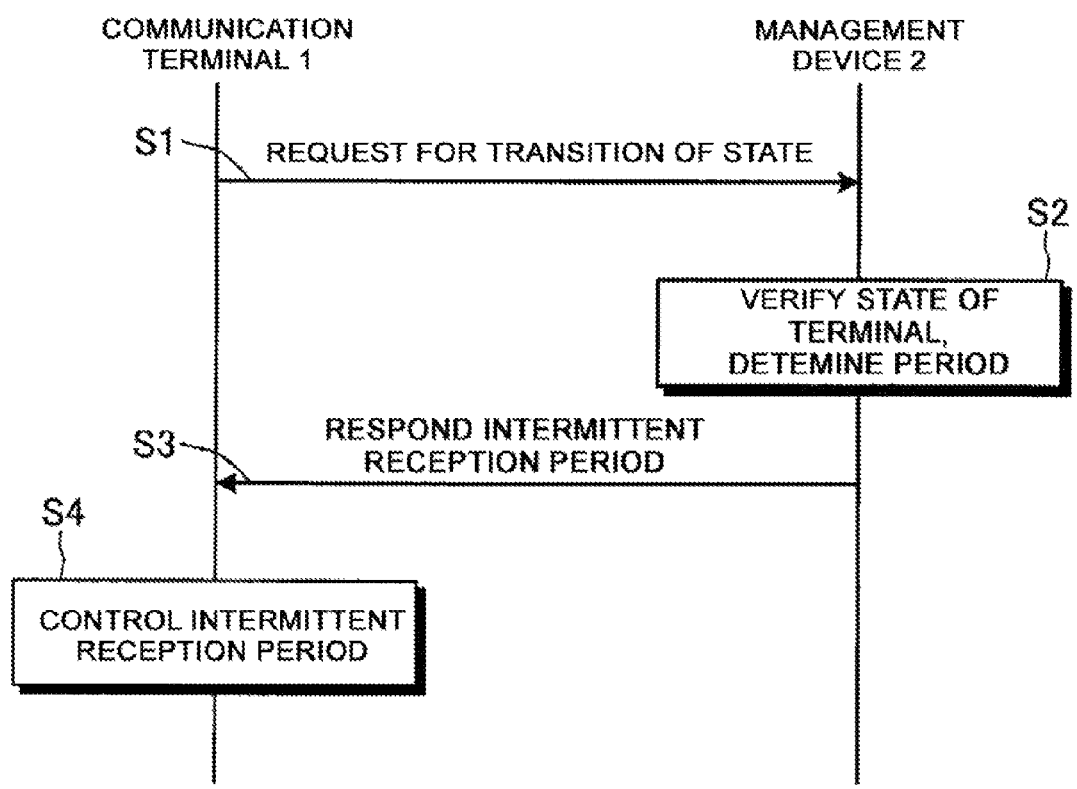
FIG. 2 illustrates a sequence diagram of a wireless communication system in accordance with the first embodiment of the present invention.

FIG. 2 illustrates a sequence diagram of a wireless communication system in accordance with the first embodiment. As illustrated in the FIG. 2, the communication terminal 1 sends a transition request to the management device 2 initiating a transition from a first operation state (e.g., a normal state) to a second operation state (e.g., an idle state) (step S1). Upon receiving the transition request from the communication terminal 1, the management device 2 verifies the state of the associated communication terminal associated with the communication terminal 1 as a communication counterpart.

The management device 2 then makes a decision as to whether the intermittent reception period of the communication terminal 1 should be changed either into a first period or a second period, based on the verified state of the associated communication terminal (step S2). Subsequently, the management device 2 transmits the determined intermittent reception period to the communication terminal 1, as a response for the transition request from the communication terminal 1 (step S3). The communication terminal 1 then controls the intermittent reception period according to the received response from the management device 2, e.g., by changing the intermittent reception period either into the first period or the second period accordingly. (step S4).

According to the first embodiment as described above, while the communication terminal 1 is in an second state (e.g. idle state), the intermittent reception period of the communication terminal 1 may be changed from the first period (T1) to the second period (T2) (T2>T1) when the associated communication terminal is in an second state (e.g. idle state) as well. As a result, the power consumption of the communication terminal 1 can be reduced in the idle state operation. In this scenario, since the possibility of incoming calls from the associated communication terminals is low because they are in an idle state, a number of delayed detection of incoming calls may be not large even with the extended intermittent reception period.

Any wireless communication system available for a communication between communication devices by making incoming and outgoing calls may be utilized for the wireless communication system including system of 802.16e specification (802.16e-2005) for mobile communication or system of Long Term Evolution (LTE). It is noted that the 802.16e specification (802.16e-2005) is the standardized specification by the 802.16 working group of the Institute of Electrical and Electronic Engineers (IEEE). Also, the LTE is being under the standardization procedure with the 3rd Generation Partnership Project (3GPP, standardization project of a Third Generation Mobile System). For the communication terminal 1 or the counterpart communication terminal, any portable terminals such as a cellular phone, Personal Handyphone System (PHS) or Personal Digital Assistants (PDA), or a computer with wireless communication card embedded or mounted may be utilized. As for the management device 2, a paging controller that performs a paging control may be used as an example.

It is noted that the following sections describe the wireless communication system built with the 802.16e specification (802.16e-2005) as an example.

Second Embodiment

Configuration of Wireless Communication System

Figure 3:
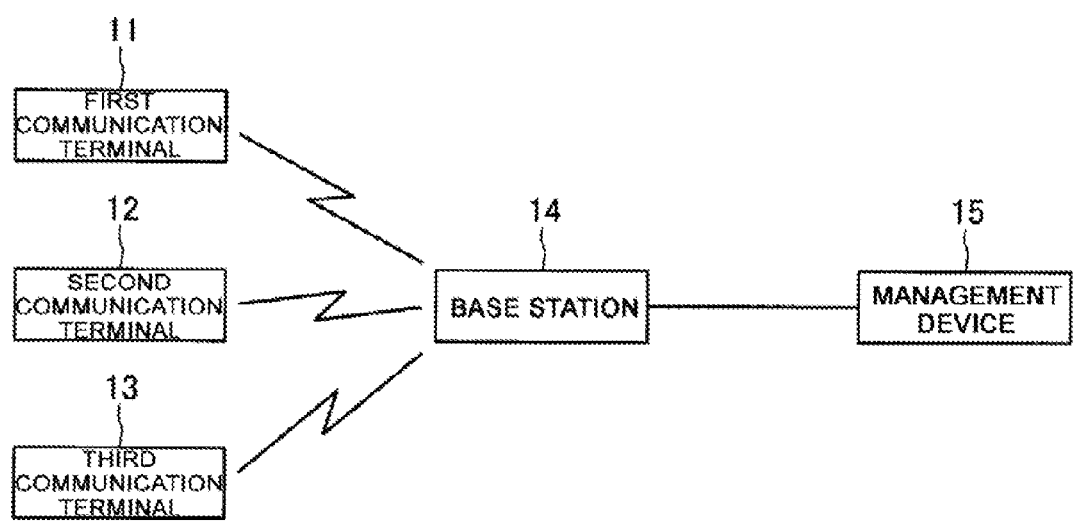
FIG. 3 depicts a block diagram of a wireless communication system in accordance with the second embodiment of the present invention.

FIG. 3 depicts a block diagram of a wireless communication system in accordance with a second embodiment. The wireless communication system of the second embodiment includes a first communication terminal 11, a second communication terminal 12 and a third communication terminal 13, as wireless communication devices. The wireless communication system further includes a base station 14 and a management device 15 connected to the communication terminals either directly or indirectly.

It is noted in the second embodiment that the first communication terminal 11 and the second communication terminal 12 belong to a communication group associated with each other as communication counterparts such as the community with a specific relationship, e.g., family or friends, etc. The second communication terminal 12 may be either a single terminal or a plurality of terminals. The third communication terminal 13 is a terminal not associated with the first communication terminal 11 as a communication counterpart. That is, the third communication terminal 13 does not belong to the same group with the first communication terminal 11. The third communication terminal 13 may also be either a single terminal or plural terminals. Further, each of the base station 14 and the management device 15 may be either a single device or a plurality of devices may be distributed throughout the wireless communication system. The management device 15 may be coupled (indirectly connected) to the base station 14 via a communication network. In particular, in the second embodiment, it is noted that the first communication terminal 11 retains information regarding the associated communication terminal (e.g., the second communication terminal 12) associated with the first communication terminal 11 as a communication counterpart, and is configured to notify the retained information of the associated communication terminal to the management device 15. Configuration of Management Device Referring to FIG. 4 which depicts a block diagram of a management device 15 in accordance with the second embodiment, the management device 15 includes a storage unit 21, a control unit 22 and a network interface 23. The storage unit 21 stores various management information 24 related to the idle state of each terminals as well as information (25) regarding associated terminal associated with the first communication terminal 11 as a communication counterpart. Examples of the various management information 24 related to the idle state of terminals include an identity (ID), an operation state (normal state, idle state, or the like) and a paging cycle of each terminal etc. A communication terminal in an idle state receives paging messages intermittently in a certain cycle (e.g. paging cycle). The information at the associated terminal information 25 of the storage unit 21 include, e.g., information of the second communication terminal 12 associated with the first communication terminal 11 as a communication counterpart. It is noted that the information 25 stored at the associated terminal of the storage unit 21 is provided from the first communication terminal 11. The control unit 22 of the storage unit 21 includes a paging cycle determination unit 26 that determines the paging cycle of the communication terminals and a control message processing unit 27 that interprets received messages or generates messages to be transmitted. The paging cycle determination unit 26 and the control message processing unit may be implemented using a processor as a controller. In this case, the processor executes processes including paging cycle determination and message processing in accordance with a program. The network interface 23 is responsible for receiving and transmitting data between base station 14, other management device and a higher level network.

Configuration of Communication Terminal

Figure 5:
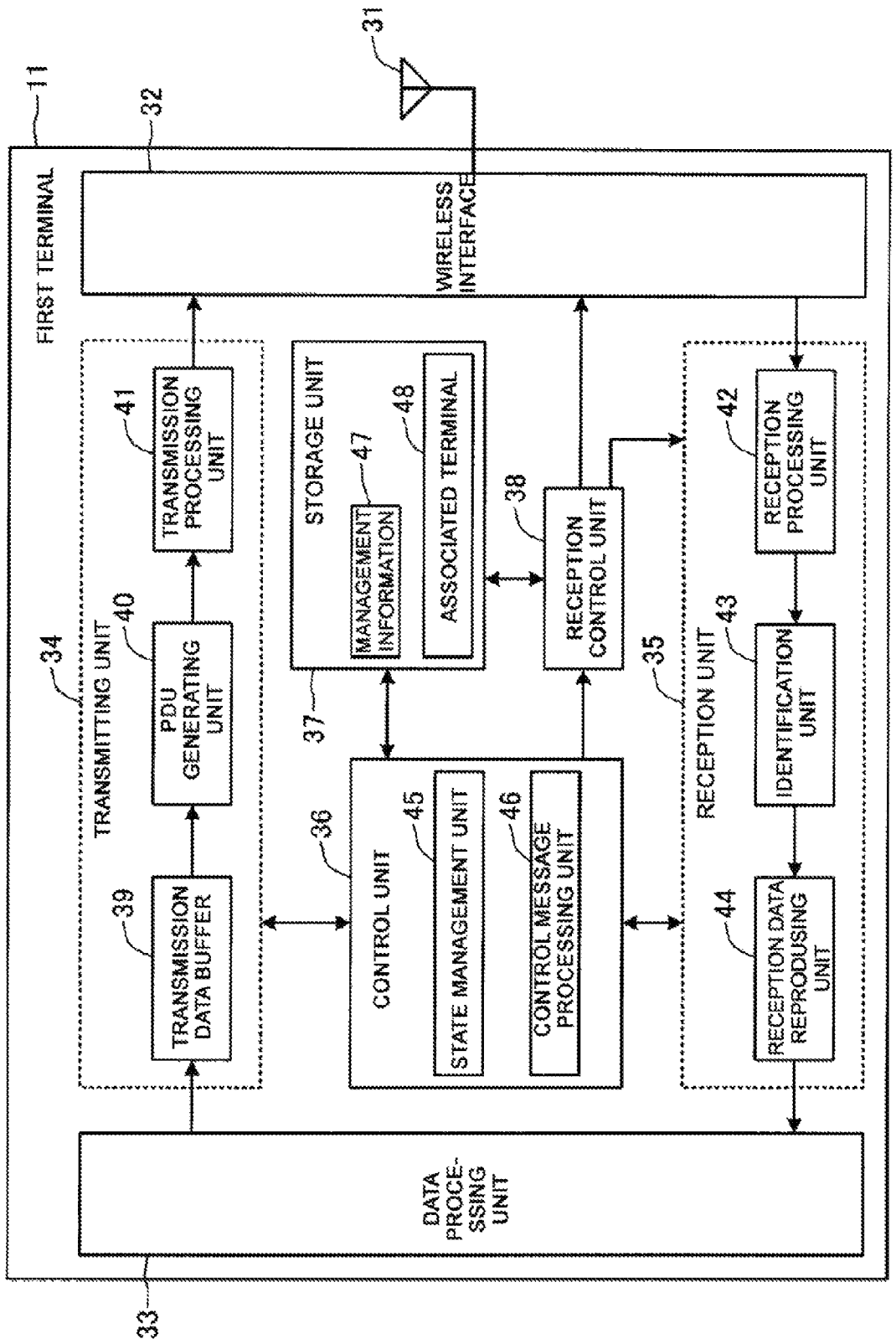
FIG. 5 depicts a block diagram of a terminal device in accordance with the second embodiment of the present invention.

Referring to FIG. 5 of the present invention which depicts a block diagram of a communication terminal (e.g., the first communication terminal 11) in accordance with the second embodiment, the first communication terminal 11 may include an antenna 31, a wireless interface 32, a data processing unit (processor) 33, a transmitting unit (transmitter) 34, a reception unit (receiver) 35, a control unit (controller) 36, a storage unit 37 and reception control unit 38. The antenna 31 is a communication interface with the external devices such as, e.g., a base station 14. The wireless interface 32 performs a transmission operation and a reception operation of radio signals with the base station 14 via antenna 31. The data processing unit 33 processes data such as a user application. The transmitting unit 34 processes the data generated by the data processing unit 33.

The transmitting unit 34 of the first communication terminal 11 in the second embodiment is equipped with a transmission data buffer 39, a Protocol Data Unit (PDU) generating unit 40 and a transmission processing unit 41. The transmission data buffer 39 temporarily stores the data generated by the data processing unit 33 as Service Data Unit (SDU). The PDU generating unit 40 converts the SDU into a PDU when a transmission slot is allocated from the base station 14. The transmission processing unit 41 performs encoding and modulating process on the PDU generated by the PDU generating unit 40 and generates a wireless frame. The generated wireless frame is converted, by the wireless interface 32, into an uplink radio signal directed to the base station and transmitted through the antenna 31.

The reception unit 35 of the first communication terminal 11 of the second embodiment includes a reception processing unit 42, an identification unit 43 and a reception data reproducing unit 44. The antenna 31 and the wireless interface 32 in combination receive the downlink radio signal from the base station 41. Subsequently, the wireless interface 32 transmits the received signal to the reception processing unit 42, and the reception processing unit extracts the reception frame out of the received signal and performs demodulating and decoding operations. The identification unit 43 classifies the demodulated and decoded data into a control message and user data. If the classified data are determined to be user data, the reception data reproducing unit 44 converts the user data (PDU) into the SDU, and transfers the SDU to the data processing unit 44 of a higher level.

The control unit 36 of the first communication terminal 11 of the second embodiment performs a control operation for the transmitting unit 34 and the reception unit 35, and is equipped with a state management unit 45 and a control message processing unit 46. The state management unit 45 manages the transition between a normal state and an idle state, and the control message processing unit 46 interprets messages received from the base station 14 and generates messages to be transmitted to the base station 14.

The storage unit 37 of the first communication terminal 11 in the second embodiment stores management information 47 related to the idle state of the terminal as well as information 48 regarding associated terminal associated with the first communication terminal 11 as a communication counterpart. The management information 47 which is related to the idle state of the communication terminal includes, e.g., the paging cycle of the first communication terminal 11 instructed by the management device 15. The information 48 of terminals associated as communication partner(s) includes, e.g., information of the second communication terminal 12.

The reception control unit 38 of the communication terminal 11 controls, by the instruction from the control unit 36, the process of the reception unit 35 based on the paging cycle stored in the storage unit 37. It is noted that the reception unit 35 receives the paging message during the Paging Listening Interval (PLI), and processes the received message. The reception unit 35, however, does not receive the paging message during the Paging Unavailable Interval (PUI). It is also noted that an overall configuration of the second communication terminal 12 and the third communication terminal 13 may be similar to the configuration of the first communication terminal 11. Alternatively, the configuration of the third communication terminal 13 may be in such a way that the information regarding the associated terminal may not be stored in the storage unit 37.

Operation of Wireless Communication System

Figure 6:
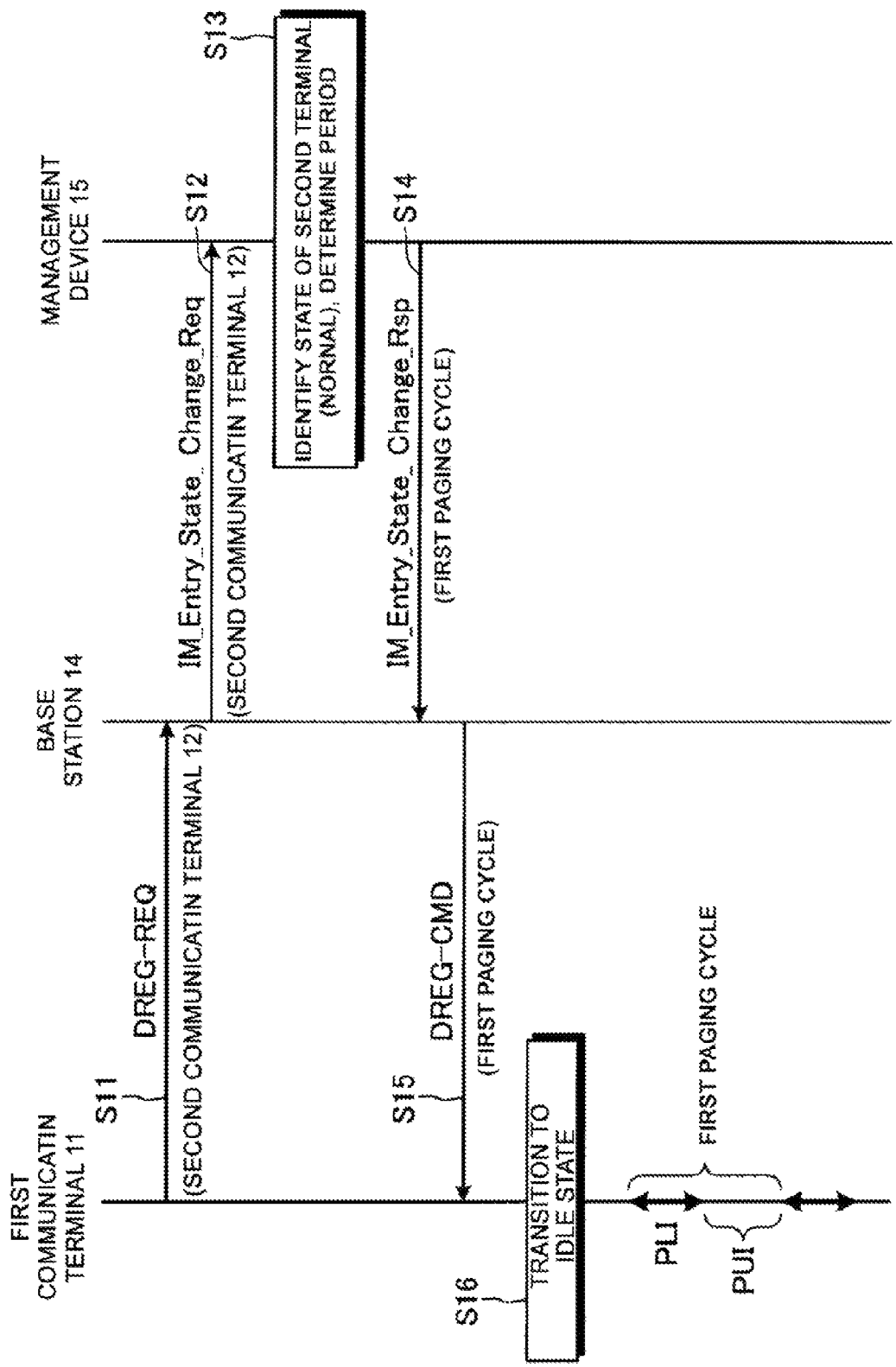
FIG. 6 illustrates a sequence diagram of a wireless communication system in accordance with the second embodiment of the present invention.

FIG. 6 illustrates a sequence diagram of a wireless communication system in accordance with the second embodiment. As illustrated in the diagram, the first communication terminal 11 transmits a requesting message (e.g., DREG-REQ) to the base station 14 when it is making a transition from a normal state to an idle state (step S11). The DREG-REG message may include, e.g., information of the associated communication terminal (e.g., the second communication terminal 12), De-registration_Request_Code (according to the type of requested de-registration), Paging Cycle Request in Tag-Length-Value (TLV) format (desired paging cycle), Idle Mode Retain Information in TLV format (the information retained in the management device 15), etc.

Upon receiving the requesting message (e.g., DREG-REQ) from the first communication terminal 11, the base station 14 transmits a state change request message (e.g., IM_Entry_State_Change_Req) to the management device 15 (step S12). The IM_Entry_State_Change_Req message includes information regarding the associated communication terminal (e.g., the second communication terminal 12) associated with the first communication terminal 11 as a communication counterpart.

Figure 4:
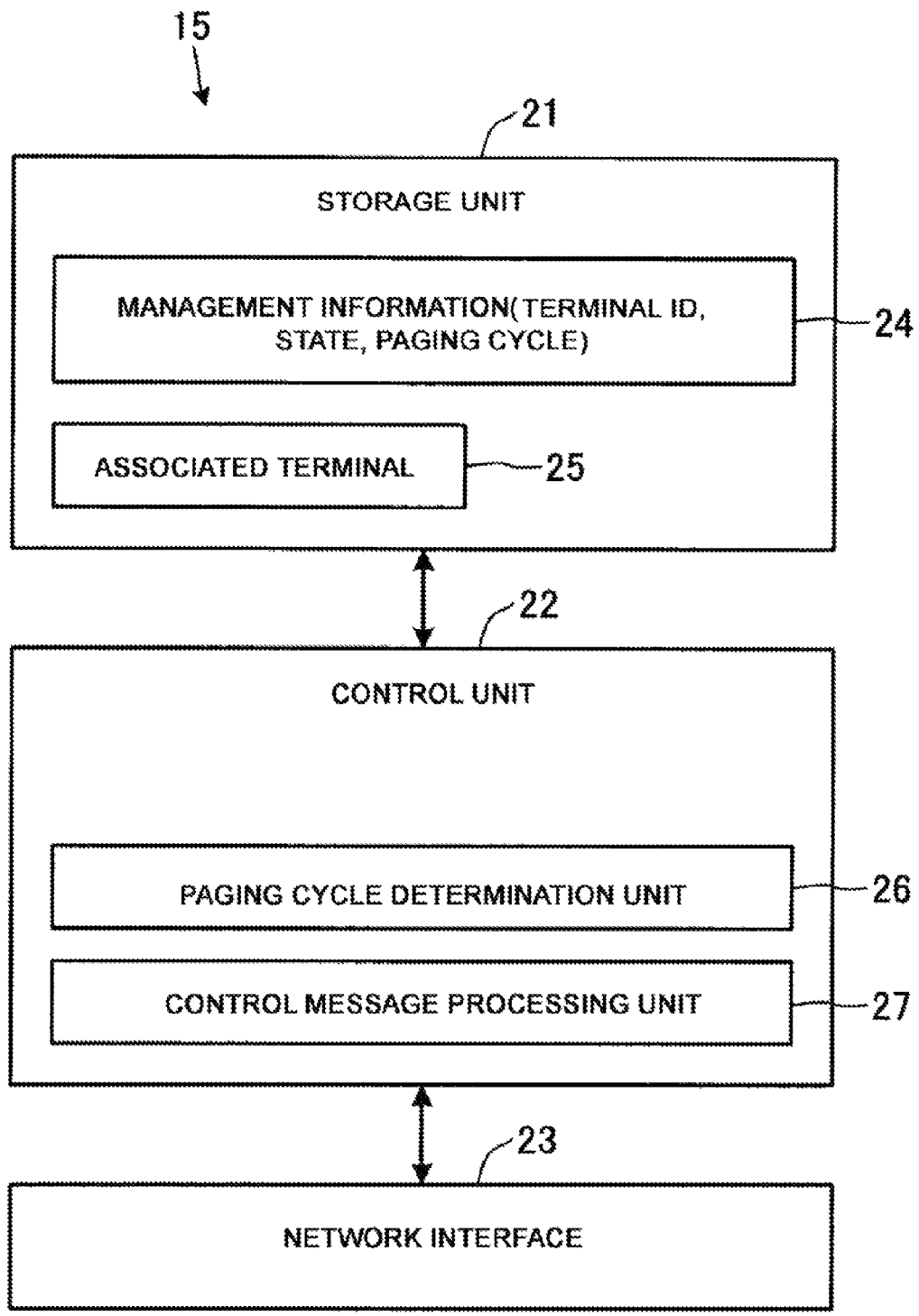
FIG. 4 depicts a block diagram of a management device in accordance with the second embodiment of the present invention.

Upon receiving the state change request message (e.g., IM_Entry_State_Change_Req) from the base station 14, the management device 15 identifies the state of the second communication terminal 12 by, e.g., referring to the management information 24 of the storage unit 21 related to the idle state (step S13), as illustrated in FIG. 4. In a case when the management information of the second communication terminal 12 is not stored in the management device 15 and managed by other management device (not described), the management device 15 may acquire the management information of the second communication terminal 12 by making an inquiry to the other management device.

In an example as illustrated in FIG. 6, the state of the second communication terminal 12 is set as a normal state (e.g., a first operation state), and, as a result, the management device 15 determines the paging cycle of the first communication terminal 11 to be the first paging cycle shorter than the second paging cycle. The management device 15 then transmits a state change response message (e.g., IM_Entry_State_Change_Rsp) to the base station 14 (step S14), i.e., the IM_Entry_State_Change_Rsp message includes information that instructs the first communication terminal 11 to change the paging cycle into the first paging cycle.

Upon receiving the state change response message (e.g., IM_Entry_State_Change_Rsp) from the management device 15, the base station 14 transmits a response message (e.g., De-registration_Command (DREG-CMD)) to the first communication terminal 11 (step S15) instructing the first communication terminal to change the paging cycle into the first paging cycle as determined by the management device 15. When the first communication terminal 11 receives the response message (e.g., DREG-CMD) from the base station 14, the first communication terminal 11 makes a transition to an idle state (step S16), and controls the PLI and PUI with the first paging cycle.

Figure 7:
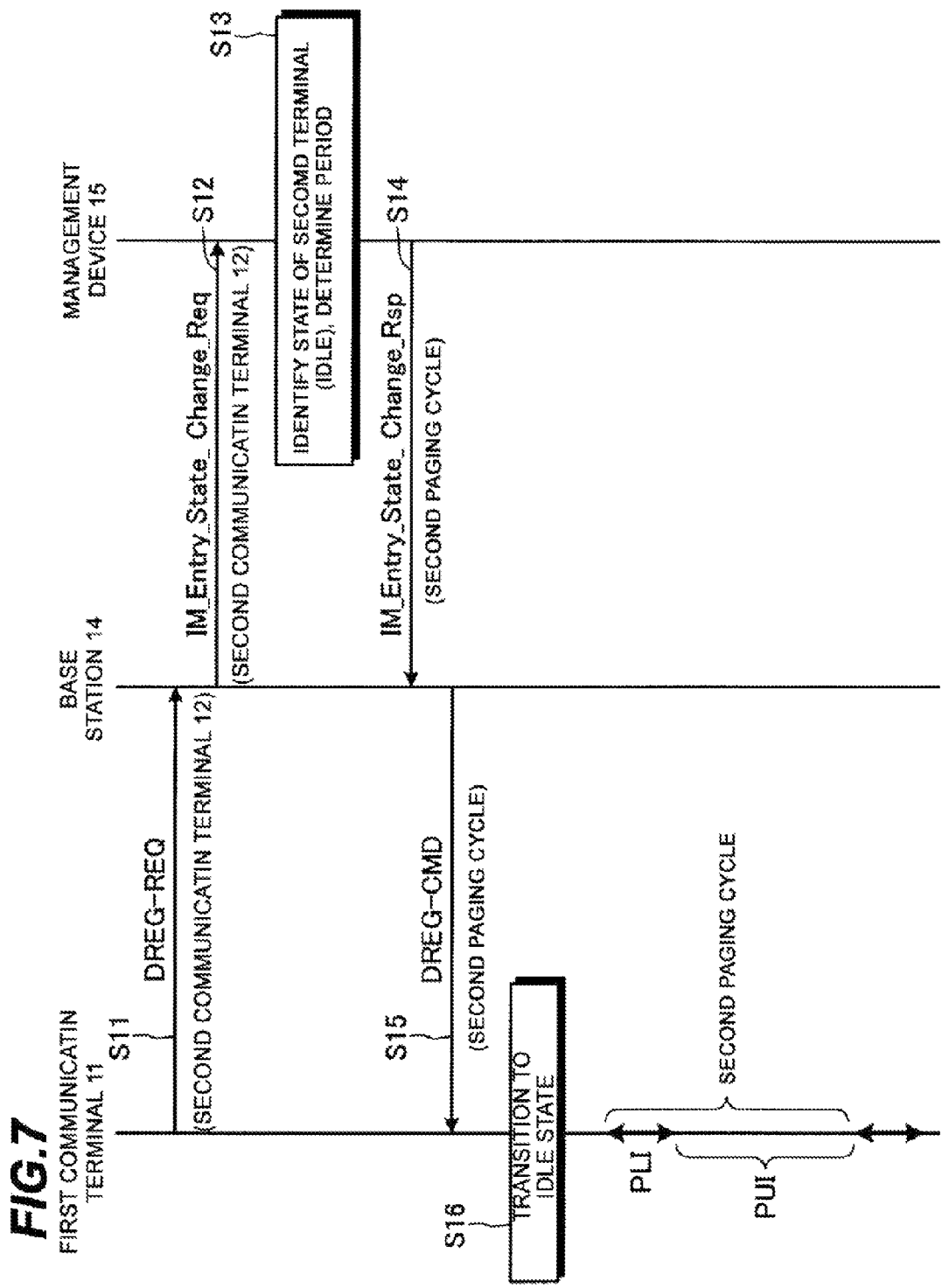
FIG. 7 illustrates a sequence diagram of a wireless communication system in accordance with the second embodiment of the present invention.

FIG. 7 depicts a sequence diagram of the second embodiment with another example. In particular, the sequence of FIG. 7 may be similar to the sequence of FIG. 6 except that the second communication terminal 12 is verified as an idle state (e.g., a second operation state) at this time. As illustrated in FIG. 7, the management device 15 determines the paging cycle of the first communication terminal 11 to be the second paging cycle which is longer than the first page cycle because it is verified that the second communication terminal 12 is in the idle state at step S13. Subsequently, the management device 15 instructs, via the base station 14, the first communication terminal 11 to change the paging cycle into the second paging cycle (steps S14, S15). Upon receiving the instruction from the base station regarding the paging cycle, the first communication terminal 11 makes a transition to the idle state (step S16), and controls the PLI and PUI with the second paging cycle.

Operation of Management Device

Figure 8:
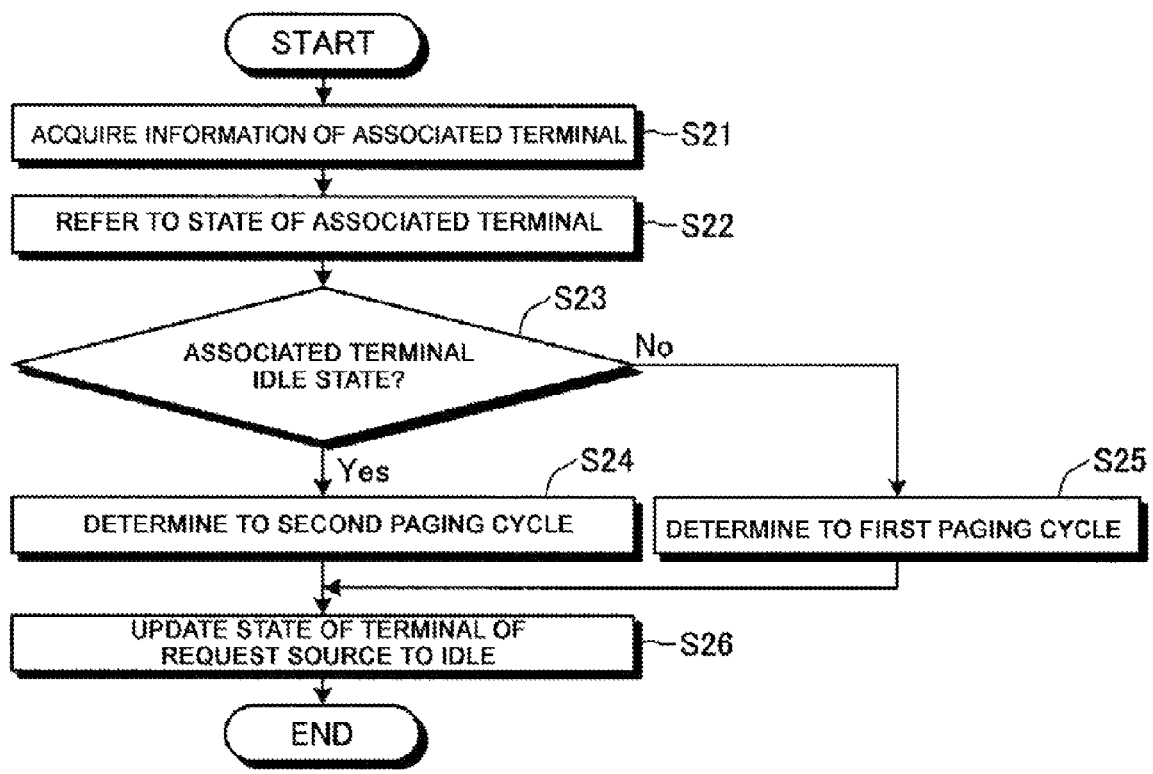
FIG. 8 is a flowchart of a management device in accordance with the second embodiment of the present invention.

FIG. 8 is a flowchart that illustrates a series of operations in the management device 15 in accordance with the second embodiment of the present invention. It is noted that there exists a plurality of associated communication terminals in this exemplary embodiment. The process at the management device 15 may begin when the management device 15 receives the state change request message (e.g., IM_Entry_State_Change_Req) from the base station 14. It is noted that the management device 15 acquires the information regarding the associated communication terminals including the second communication terminal 12 from the first communication terminal 11 via the base station 14, and stores the obtained information at the storage unit 21 (step S21) in this embodiment. The management device 15 may then refer to the various management information 24 at the storage unit 21 for the state of the associated communication terminals (step S22).

If it is determined that all of the associated communication terminals including the second communication terminal 12 are in an idle state (step S23: Yes), the management device 15 determines the paging cycle of the first communication terminal 11 to be a second paging cycle which is longer than an existing first paging cycle using, e.g., the paging cycle determination unit 26 (step S24). If, however, any one of the associated communication terminals including the second communication terminal 12 is in a normal state (step S23: No), the management device 15 determines the paging cycle of the first communication terminal 11 to be the first paging cycle by the paging cycle determination unit 26 (step S25). Subsequently, the management device 15 updates the state of the first communication terminal 11 into the idle state (step S26), and terminates a series of processes.

According to the second embodiment as explained above, when all of the associated communication terminals including the second terminal 12 are in the idle state while the first communication terminal 11 is in the idle state, the paging cycle of the first communication terminal 11 becomes a longer period (e.g. a second paging cycle) since the possibility of receiving an incoming call is low at the first communication terminal 11 thereby reducing the power consumption of the first communication terminal 11 in the idle state. Meanwhile, when any one of the associated terminals is in a normal state, the paging cycle of the first communication terminal 11 becomes a shorter period (e.g., a first paging cycle) even if the first communication terminal 11 is in the idle state, since it is likely that any one of the associated communication terminals may place a call to the first communication terminal 11. As a result, the first communication terminal 11 may be able to respond to a call promptly even when the first communication terminal 11 is in the idle state.

Third Embodiment

Configuration of Management Device

Figure 9:
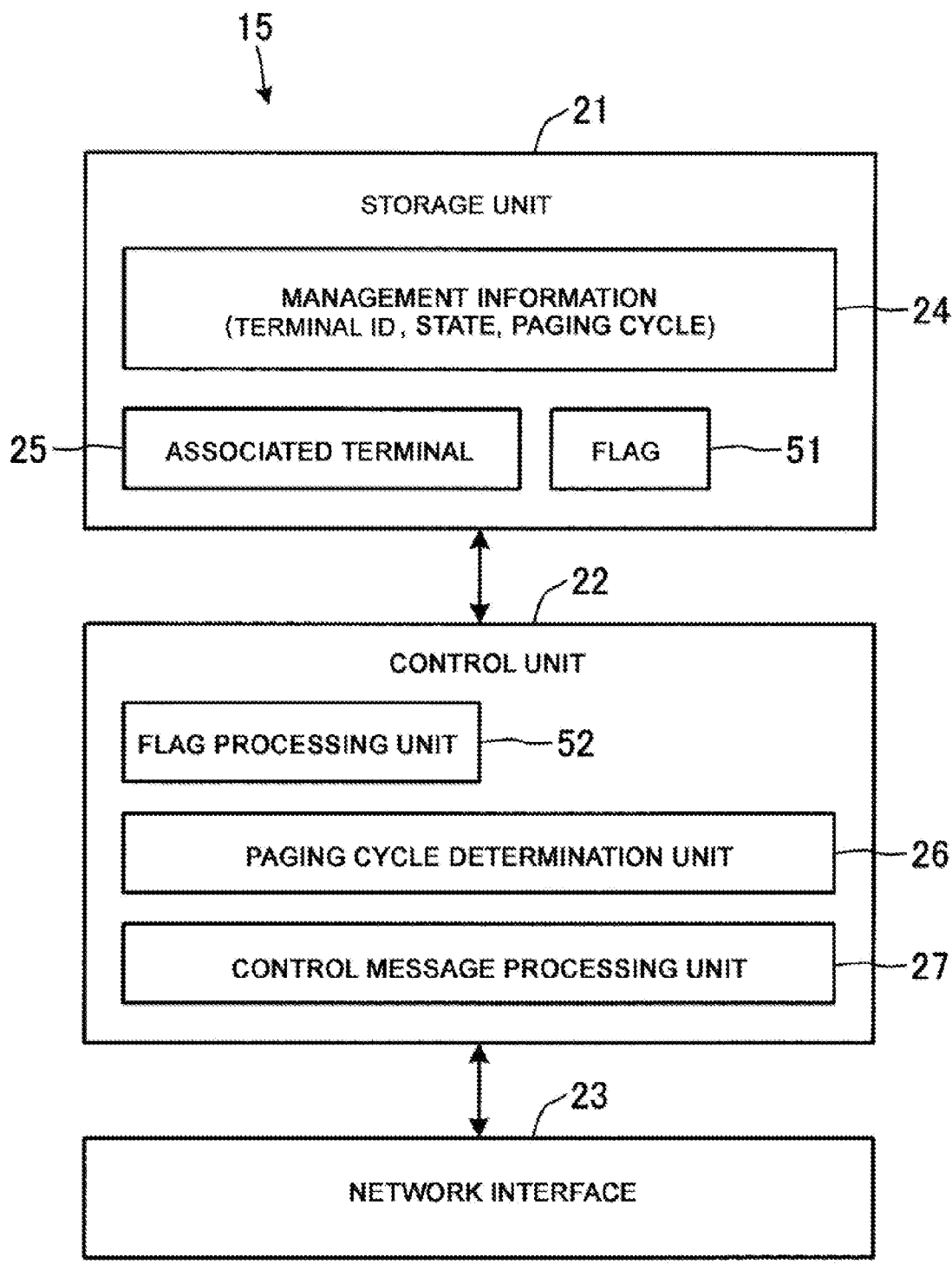
FIG. 9 depicts a block diagram of a management device in accordance with the third embodiment of the present invention.

FIG. 9 depicts a block diagram of a management device in accordance with the third embodiment. As illustrated in the figure, the management device 15 of the third embodiment has similar structure to the second embodiment as illustrated in FIG. 4 including sub-elements such as a storage unit 21, a control unit 22 and a network interface 23. It is noted however that the management device 15 of the third embodiment further includes information flag 51 in the storage unit 21. The information flag 51 indicates that the state of the associated communication terminal has been referred to and the paging cycle of the first communication terminal 11 is determined to be a second paging cycle (i.e., a longer paging cycle than a first paging cycle) when the first communication terminal 11 makes a request for a transition from a normal state to an idle state.

Furthermore, the management device 15 of the third embodiment is equipped with a flag processing unit 52 in the control unit 22 configured to set up the flag information 51 to the storage unit 21, or refer to the information flag 51 from the storage unit 21. In particular, the paging cycle of the first communication terminal 11 is changed from the second paging cycle to the first paging cycle when the state of the associated second communication terminal 12 changes from an idle state to a normal state in the third embodiment. Also, it is noted that similar wireless communication system and communication terminal used in the second embodiment may be used in this third embodiment.

Operation of Wireless Communication System (I)

Figure 10:
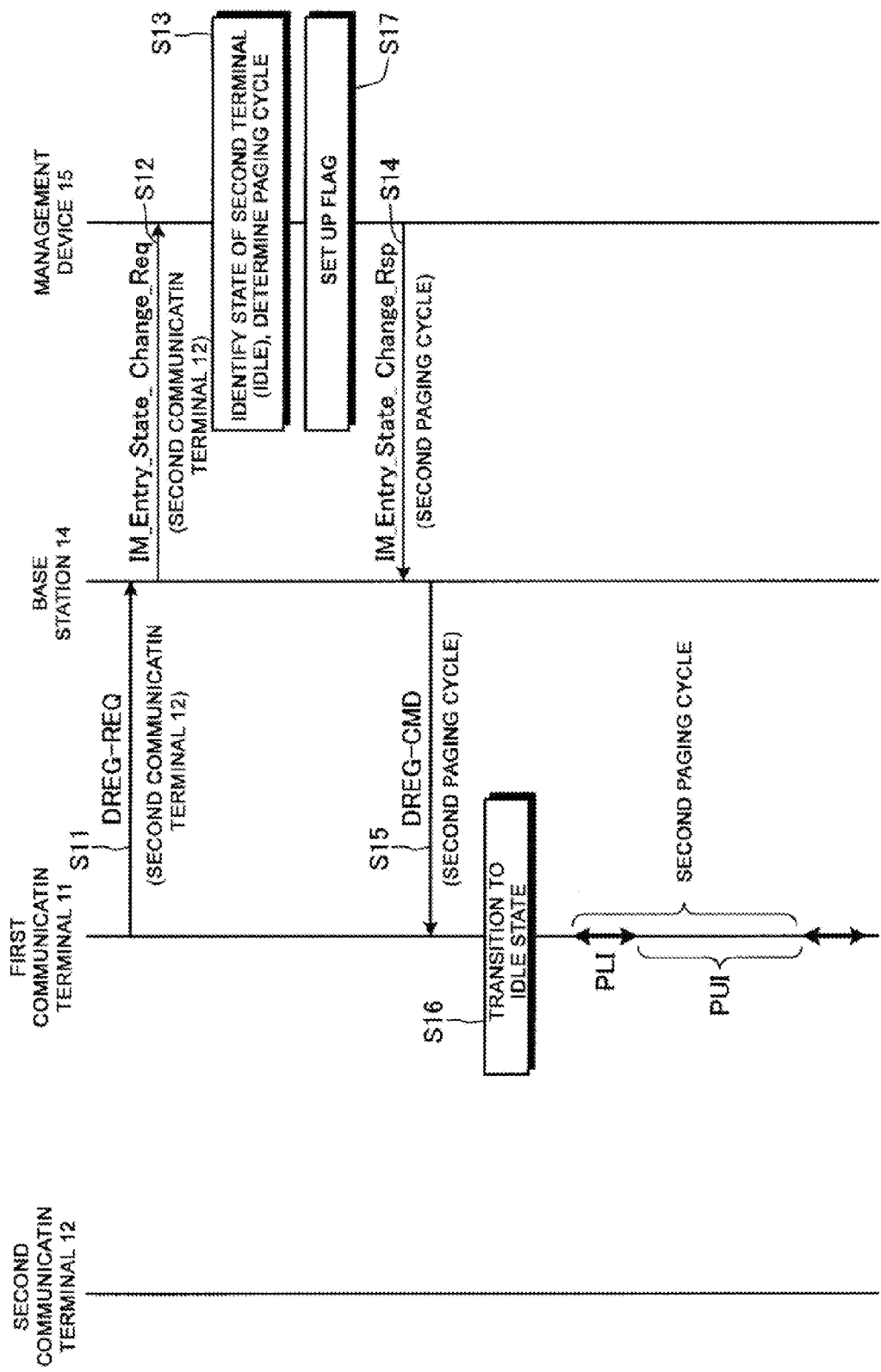
FIG. 10 illustrates a sequence diagram of a wireless communication system in accordance with the third embodiment of the present invention.

FIG. 10 illustrates a sequence diagram of a wireless communication system in accordance with the third embodiment. In this exemplary case, when the second communication terminal 12 associated with the first communication terminal 11 as communication counterpart is in an idle state, the management device 15 determines the paging cycle of the first communication terminal to be the second paging cycle (step S13), and then sets up the information flag 51 in the storage unit 21 accordingly (step S17). Subsequently, with the instruction from the management device 15 (steps S14, S15), the first communication terminal 11 makes a transition to an idle state (step S16), and controls the PLI and PUI with the second paging cycle as determined by the management device 15.

Operation of Management Device (I)

Figure 11:
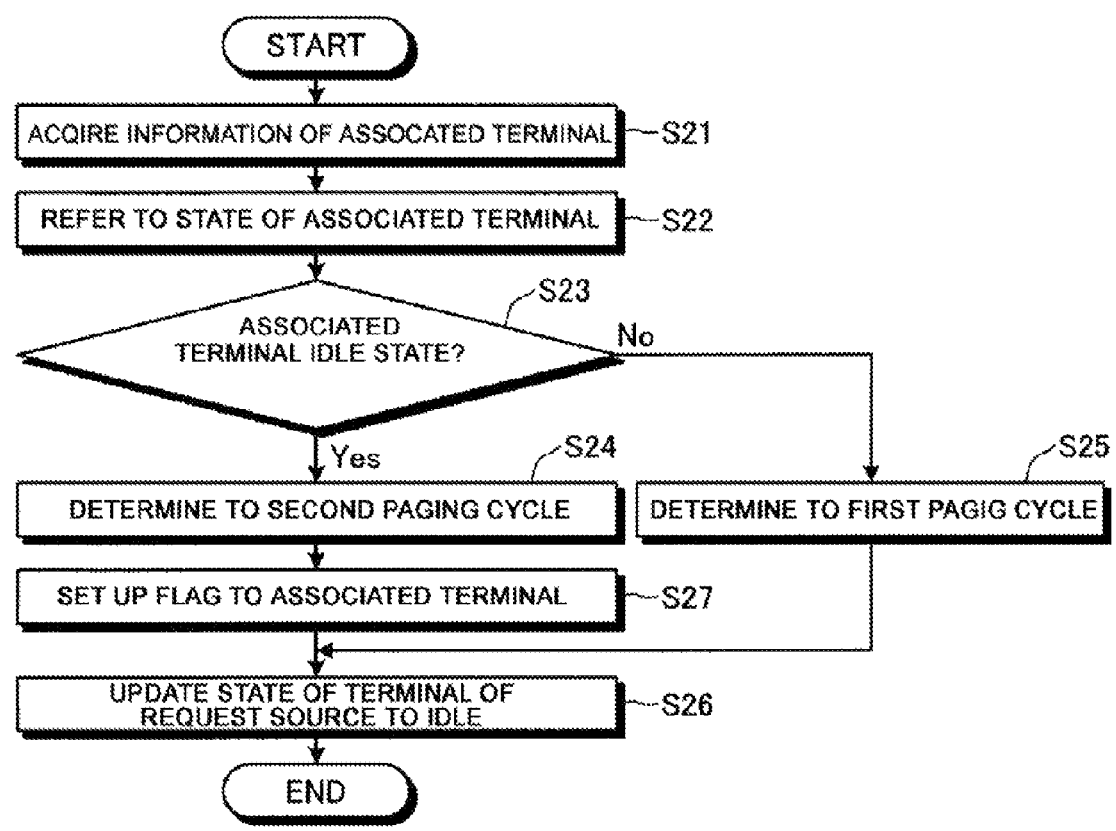
FIG. 11 is a flowchart of a management device in accordance with the third embodiment of the present invention.

FIG. 11 is a flowchart that illustrates a series of operations in the management device 15 in accordance with the third embodiment. As illustrated in the figure, the management device 15 determines the paging cycle of the first communication terminal 11 to be the second paging cycle (step S24), and then sets up the information flag 51 onto the associated terminal (e.g., the second communication terminal 12) associated with the first communication terminal 11 as a communication counterpart (step S27). It is noted that when the management device 15 determines the paging cycle of the first communication terminal 11 to be the first paging cycle at step S25, it does not set up the information flag 51 onto the associated terminal.

Figure 12:
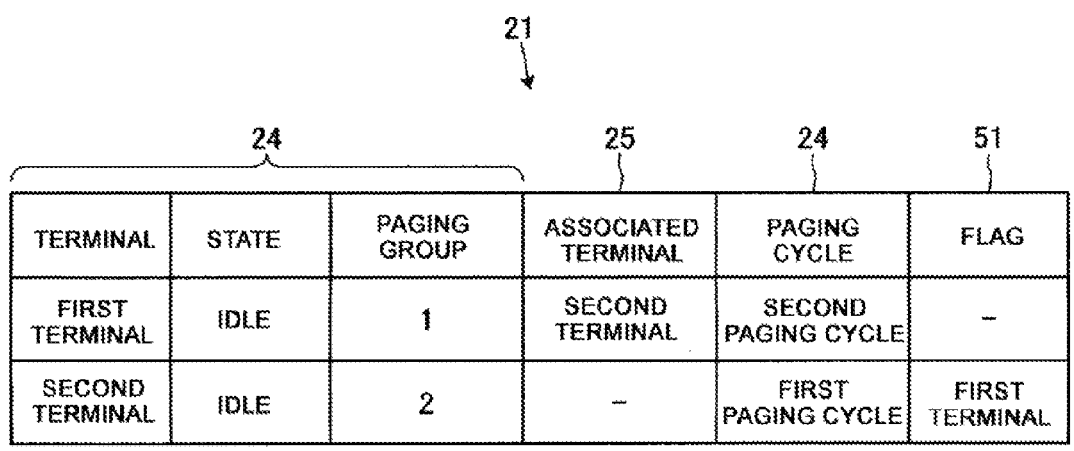
FIG. 12 is a table describing a management information in accordance with the third embodiment of the present invention.

FIG. 12 depicts a table illustrating management information in accordance with the third embodiment. As illustrated, the information flag of the second communication terminal 12 is set up and maintained as "first terminal", since the state of the second terminal 12 has been referred to and the paging cycle of the first communication terminal 11 has been determined to be the second paging cycle as described above.

Operation of Wireless Communication System (II)

Figure 13:
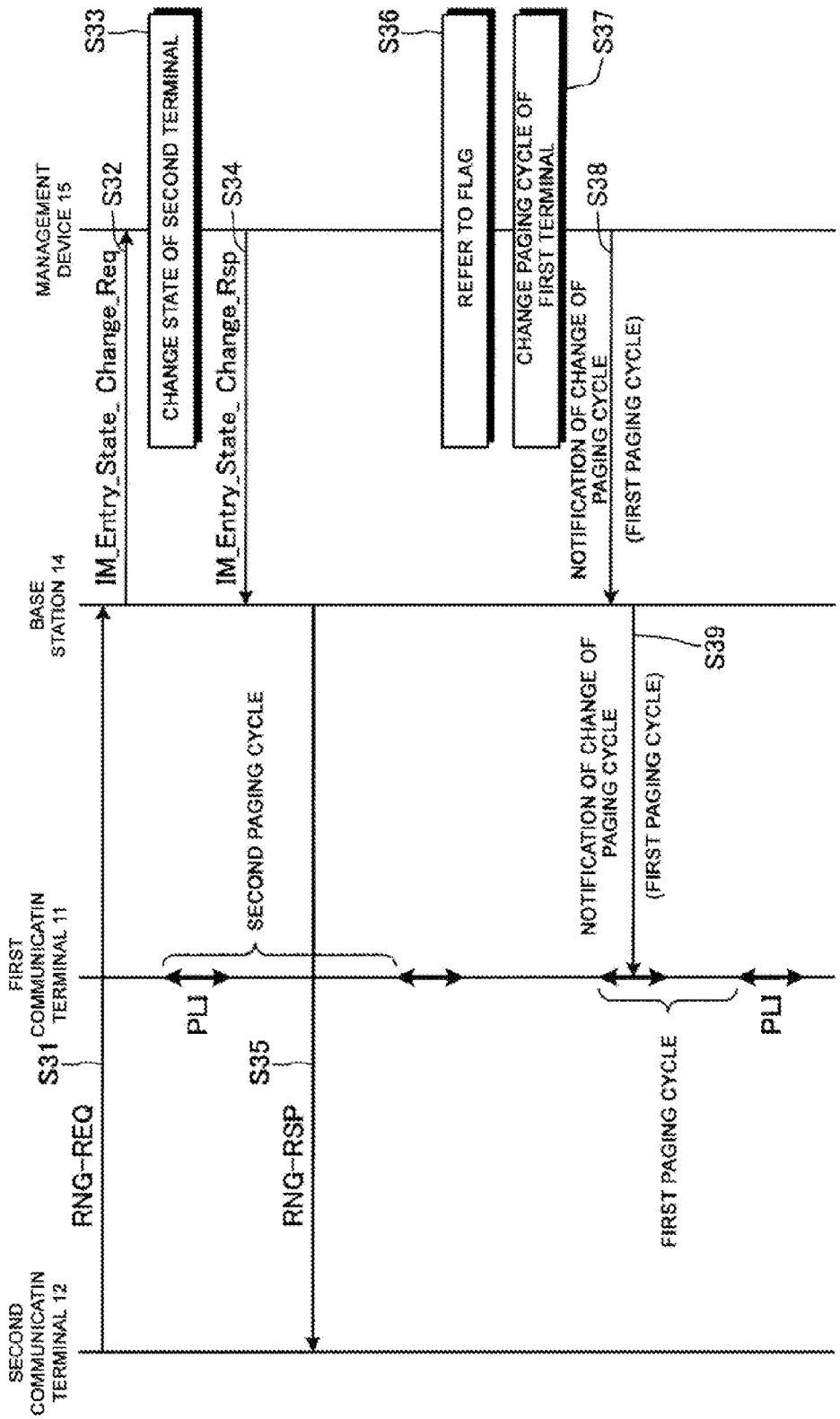
FIG. 13 illustrates a sequence diagram of a wireless communication system in accordance with the third embodiment of the present invention.

FIG. 13 illustrates a sequence diagram of a wireless communication system in accordance with the third embodiment. It is assumed that the first communication terminal 11 and the second communication terminal 12 are in an idle state and the paging cycle of the first communication terminal 11 is set to be the second paging cycle. As illustrated in FIG. 13, the second communication terminal 12 returns from an idle state to a normal state by transmitting a request message (e.g., Ranging_Request (RNG-REQ)) to the base station 14, and initiating a re-entry process to the network (step S31). The base station 14, upon receiving the request message (e.g., RNG-REQ) from the second communication terminal 12, transmits another request message (e.g., IM_Entry_State_Change_Req) to the management device 15 requesting to change the state of the second communication terminal 12 to the normal state (step S32).

The management device 15, in response to the request from the base station 14, changes the state of the second communication terminal 12 from the idle state to the normal state (step S33), and transmits a response message (e.g., IM_Entry_State_Change_Rsp) back to the base station 14 (step S34). Upon receiving the response message (e.g., IM_Entry_State_Change_Rsp) from the management device 15, the base station 14 transmits another response message (e.g., RNG-RSP) (a ranging response) to the second communication terminal 12 (step S35) thereby allowing the second communication terminal to return from the idle state to the normal state.

Meanwhile, the management device 15 refers to the information flag 51 of the second communication terminal 12 (step S36), and changes the paging cycle of the first communication terminal 11 from the second paging cycle to the first paging cycle (step S37). The management device 15 then transmits a message to the base station 14 notifying the change of the paging cycle (step S38). Upon receiving the change notification message from the management device 15, the base station 14 transmits the received change notification message to the first communication terminal 11 in a next PLI (step S39). Upon receiving the change notification message from the base station 14, the first communication terminal 11 changes the following paging cycle from the second paging cycle to the first paging cycle, and continues the idle operation.

Operation of Management Device (II)

Figure 14:
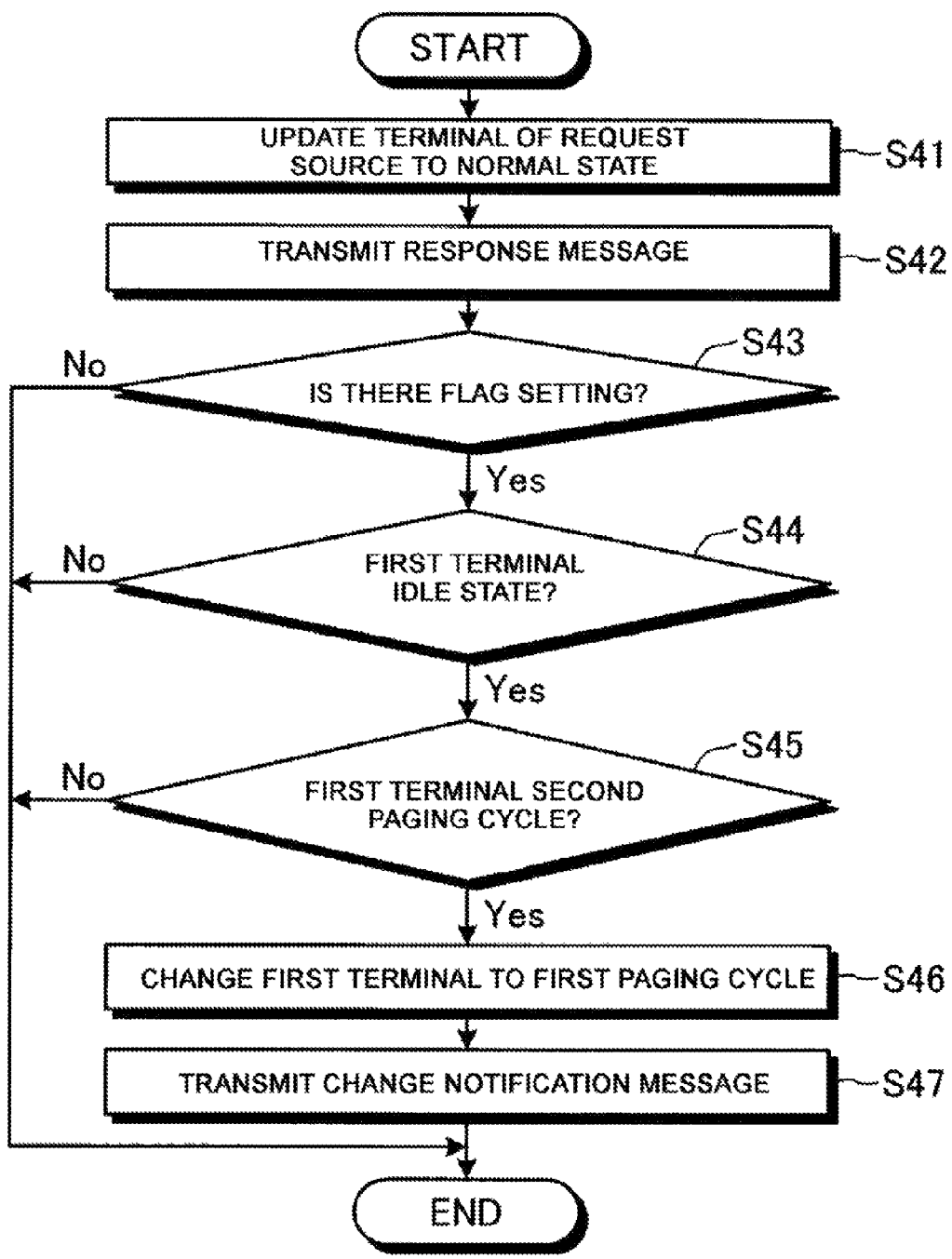
FIG. 14 is a flowchart of a management device in accordance with the third embodiment of the present invention.

FIG. 14 is a flowchart that illustrates a series of operations in the management device 15 in accordance with the third embodiment. As illustrated in the flow chart, when the management device 15 receives a request message (e.g., IM_Entry_State_Change_Req) from the base station 14 generated based on the request from the second communication terminal 12, the management device 15 updates and changes the state of the second communication terminal 12 from the idle state to the normal state (step S41). Subsequently, the management device 15 transmits a response message (e.g., IM_Entry_State_Change_Rsp) to the base station 14 (step S42), and checks whether the information flag 51 of the second communication terminal 12 has been set up (step S43). If it is determined that the information flag 51 has not been set up (step S43: No), the management device 15 terminates the process.

If however it is determined that the information flag 51 has been set up (step S43: Yes), the management device 15 refers to the current state of the first communication terminal 11 (step S43: Yes) and terminates the process if the state of the first communication terminal 11 is in a normal state (step S44: No). If it is determined however that the state of the first communication terminal 11 is in an idle state (step S44: Yes), the management device 15 refers to the paging cycle instructed to the first communication terminal 11 (step S45), and terminates the process if the second paging cycle is not instructed to the first communication terminal 11 (step S45: No). If it is determined however that the second paging cycle is instructed to the first communication terminal 11 (step S45: Yes), the management device 15 changes the paging cycle of the first communication terminal 11 to the first paging cycle (step S46) since it is now possible that a call from the second terminal 12 that returned to the normal state may be placed. The management device 15 then transmits the change notification message of the paging cycle to the base station 14 (step S47), and terminates a series of processes.

FIG. 15 illustrates a table describing management information in accordance with the third embodiment. As illustrated in the table, and according to the operation of wireless communication system II and the operation of management device II described above, the state of the second communication terminal 12 is updated to become a normal state from an idle state, and the paging cycle of the second communication terminal 12 is updated to become N/A (i.e., no paging cycle) from the first paging cycle. In the mean time, the first communication terminal 11 continues to maintain the idle state, and the paging cycle of the first communication terminal 11 is updated from the second paging cycle to the first paging cycle.

According to the third embodiment as described above, while the first communication terminal 11 is in an idle state, and the associated communication terminal (e.g., the second communication terminal 12) returns from an idle state to a normal state, the paging cycle of the first communication terminal 11 is changed into the first paging cycle. As a result, the first communication terminal 11 may respond to a call from the associated second communication terminal 12 promptly.

Fourth Embodiment

Configuration of Communication Terminal

Figure 16:
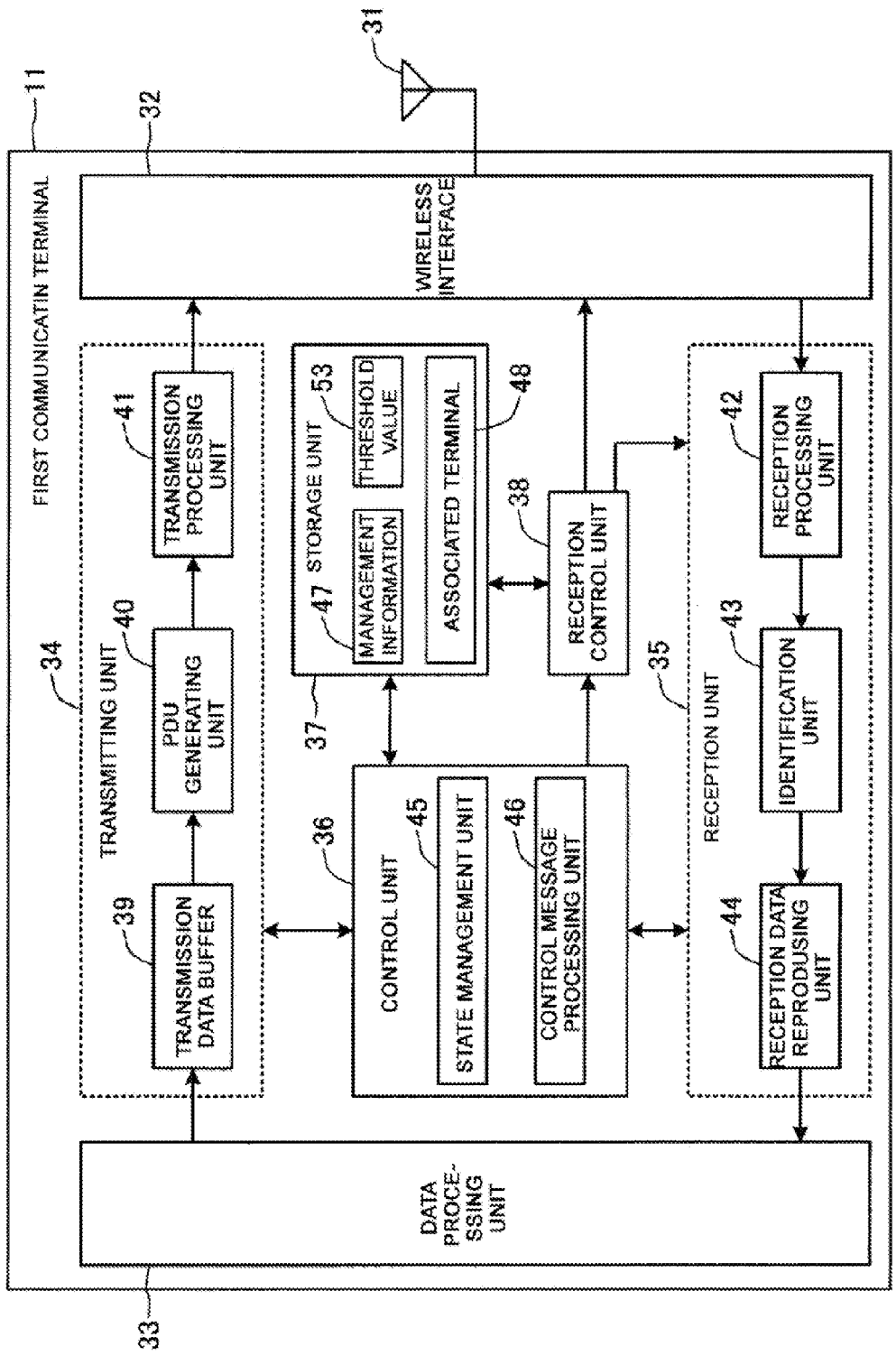
FIG. 16 depicts a block diagram of a terminal in accordance with the fourth embodiment of the present invention.

FIG. 16 depicts a block diagram of a first communication terminal 11 in accordance with a fourth embodiment. Specifically, the first communication terminal 11 of the fourth embodiment stores information regarding a threshold value 53 in the storage unit 37. In particular, the first communication terminal 11 of the fourth embodiment is instructed to have the second paging cycle as explained in the second embodiment as long as the number of the associated communication terminals including the second communication terminal 12 associated with the first communication terminal as communication counterparts does not exceed the threshold value. However, when the number of the associated communication terminals exceeds the threshold value, the first communication terminal 11 is instructed to use the first paging cycle. It is noted that the wireless communication system and the management device of the fourth embodiment may be similar to the wireless communication system and the management device in the second embodiment.

Operation of Wireless Communication System

Figure 17:
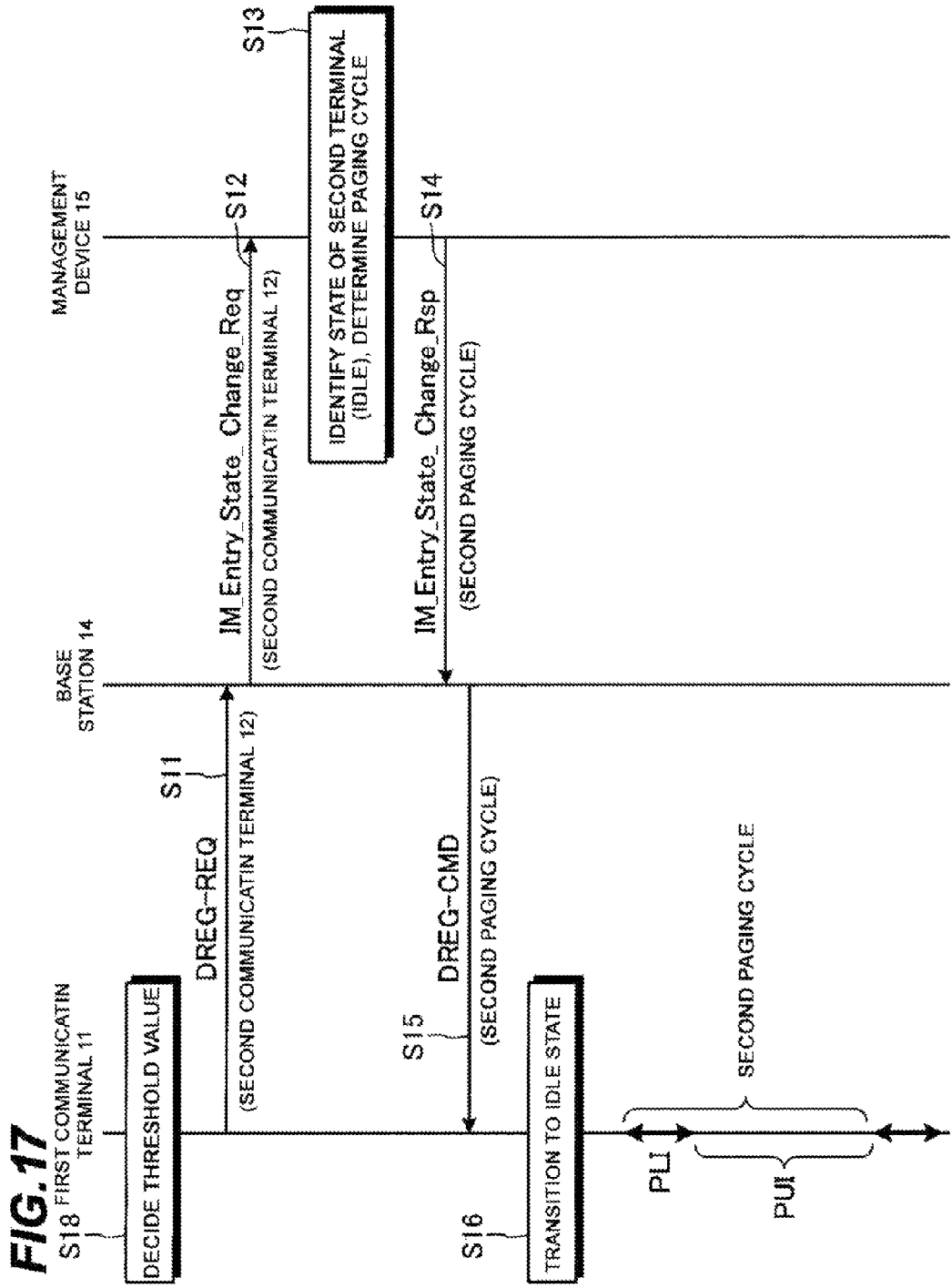
FIG. 17 illustrates a sequence diagram of a wireless communication system in accordance with the fourth embodiment of the present invention.

FIG. 17 illustrates a sequence diagram of the wireless communication system in accordance with the fourth embodiment. As illustrated in FIG. 17, the first communication terminal 11 determines whether the number of the associated communication terminals exceeds the threshold value first when the first communication terminal 11 makes a transition from a normal state to an idle state (step S18). If it is determined that the number of the associated communication terminals does not exceed the threshold value, the first communication terminal 11 sends a requesting message (e.g., DREG-REQ) to the base station 14 by adding the information regarding the associated communication terminals including the second communication terminal 12 to the requesting message (step S11). Subsequently, as described in the second embodiment, the first communication terminal 11 makes a transition to the idle state (step S12~S16), and controls the PLI and PUI with the first or second paging cycle.

If it is determined however that the number of the associated communication terminals exceeds the threshold value, the first communication terminal 11 sends the requesting message (e.g., DREG-REQ) to the base station 14 without adding the information of the associated terminals to the requesting message (step S11). Subsequently, the management device 15 instructs the first communication terminal 11 to change the paging cycle into the first paging cycle (steps S12~S15). The first communication terminal 11 then makes a transition to the idle state (step S16), and controls the PLI and PUI with the first paging cycle as instructed by the management device 15.

Operation of Management Device

Figure 18:
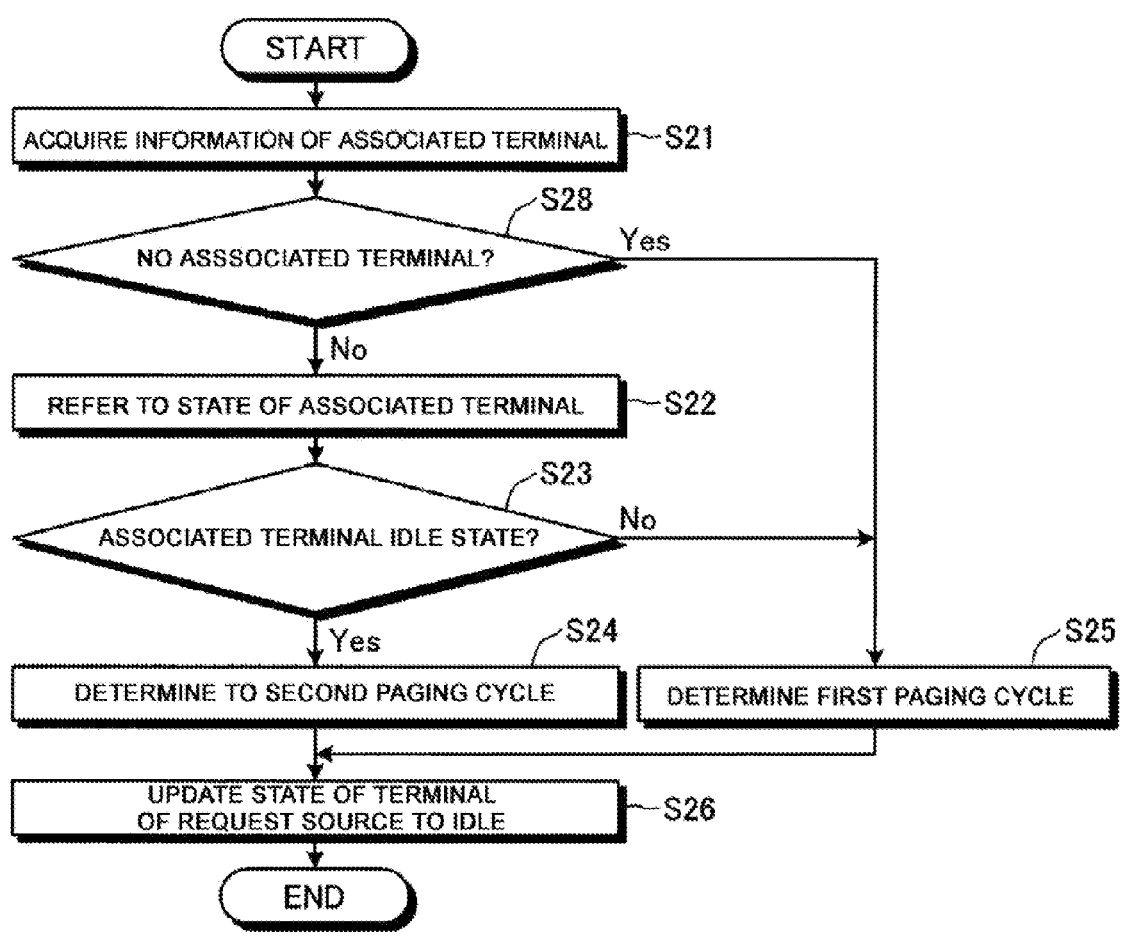
FIG. 18 is a flowchart of a management device in accordance with the fourth embodiment of the present invention.

FIG. 18 is a flowchart that illustrates a series of operations performed by the management device 15 in accordance with the fourth embodiment. First of all, the management device 15 acquires the information of the associated communication terminals including the second communication terminal 12 (step S21). However, if it is determined that there is no information of the associated communication terminals in the storage unit 21 (e.g., no associated communication terminal) (step S28: Yes), the management device 15 determines the paging cycle of the first communication terminal 11 to be the first paging cycle (step S25). If it is determined however that there is information regarding the associated terminals (step S28: No), the paging cycle of the first communication terminal 11 is determined according to the state of the associated communication terminals as explained in the second embodiment (steps S24, S25).

According to the fourth embodiment as described above, the paging cycle of the first communication terminal 11 may be determined instantly to the first paging cycle when the number of the associated terminals is substantially large. This feature of the fourth embodiment prevents problems such as a delayed time in checking the state of all of the associated communication terminals, or enlarged overhead of an inquiry message. Additionally, in the fourth embodiment, as in the third embodiment, if the associated communication terminals including the second communication terminal 12 return from an idle state to a normal state while the first communication terminal 11 is in the idle state, the paging cycle of the first communication terminal 11 may be changed into the first paging cycle.

Fifth Embodiment

Operation of Wireless Communication System

Figure 19:
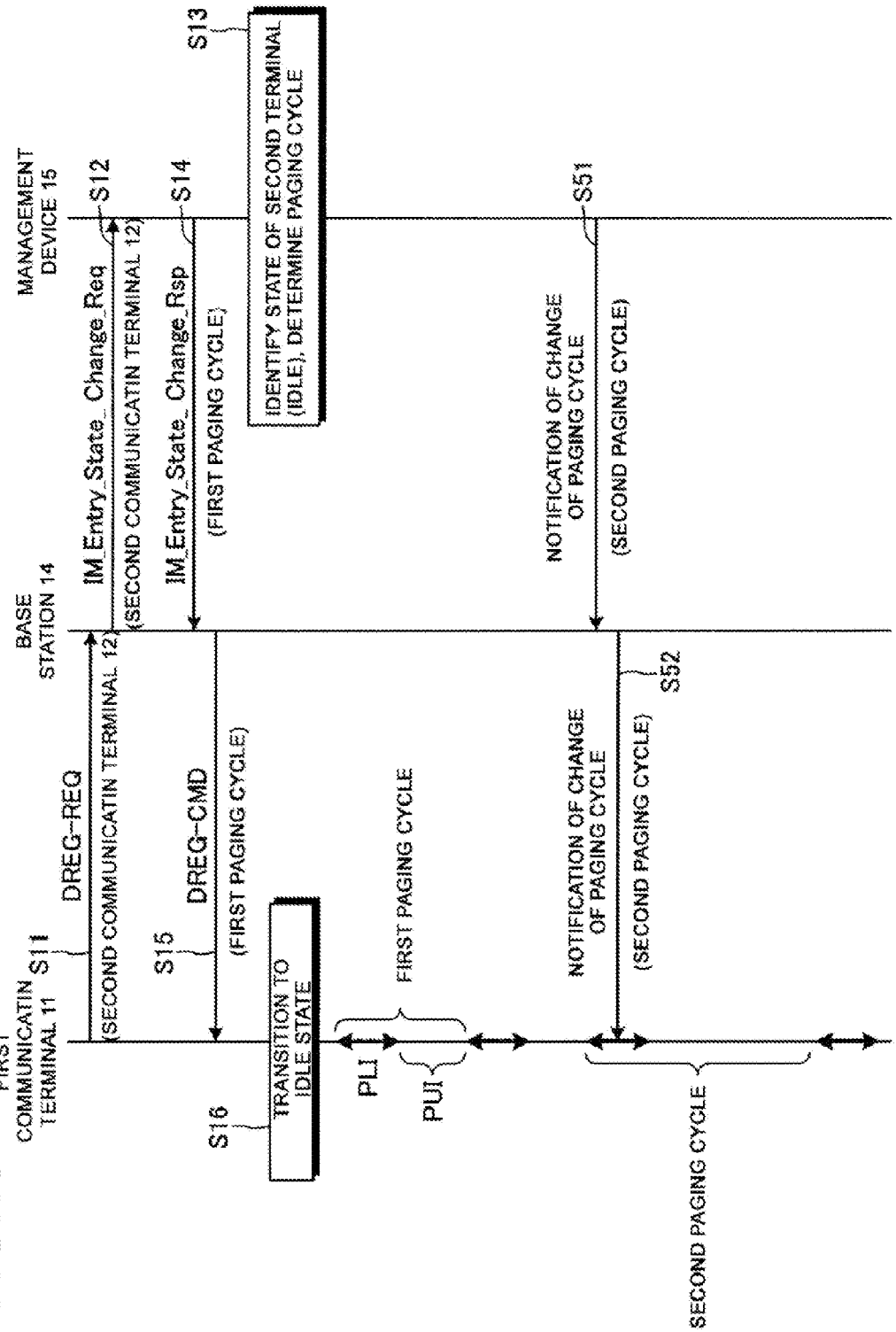
FIG. 19 illustrates a sequence diagram of a wireless communication system in accordance with the fifth embodiment of the present invention.

FIG. 19 illustrates a sequence diagram of a wireless communication system in accordance with a fifth embodiment. As illustrated in the sequence diagram of FIG. 19, once the management device 15 receives a state change request message (e.g., IM_Entry_State_Change_Req) from the base station 14 (steps S11, S12), the management device 15, via the base station 14, instantly instructs the first communication terminal 11 to have the first paging cycle (steps S14, S15). Upon receiving the instant instruction, the first communication terminal 11 makes a transition to an idle state (step S16), and controls the PLI and PUI with the first paging cycle as determined by the management device 15.

Subsequently, after instructing the first communication terminal 11 to have the first paging cycle, the management device 15 determines the paging cycle of the first communication terminal 11 to be the second paging cycle (step S13) when the management device 15 confirms that the second communication terminal 12 is in an idle state. The management device 15 then transmits a change notification message of the paging cycle to the first communication terminal 11 via the base station 14 (steps S51, S52).

Upon receiving the change notification message, the first communication terminal 11 changes the following paging cycle into the second paging cycle from the first paging cycle, and maintains the idle state operation. It is noted that the wireless communication system, the management device and the communication terminals of the fifth embodiment may have similar structures to the wireless communication system, the management device and the communication terminals of the second embodiment as illustrated above.

One of the advantages of the fifth embodiment as described above is that the paging cycle of the first communication terminal 11 may be instantly determined to be the first paging cycle even if there is a delay in the management device 15 to identify the state of all of the associated terminals. Once the paging cycle of the first communication terminal 11 is instantly determined to be the first paging cycle, the paging cycle may be changed into the second paging cycle later if it is determined that the associated communication terminal is in an idle state. Moreover, it is noted that when the associated communication terminal (e.g., the second communication terminal 12) returns from the idle state to the normal state while the first communication terminal 11 is in the idle state, the paging cycle of the first communication terminal 11 may be changed into the first paging cycle as in the third embodiment, and the first communication terminal 11 may perform a threshold value decision as in the fourth embodiment.

Sixth Embodiment

Configuration of Communication Terminal

Figure 20:
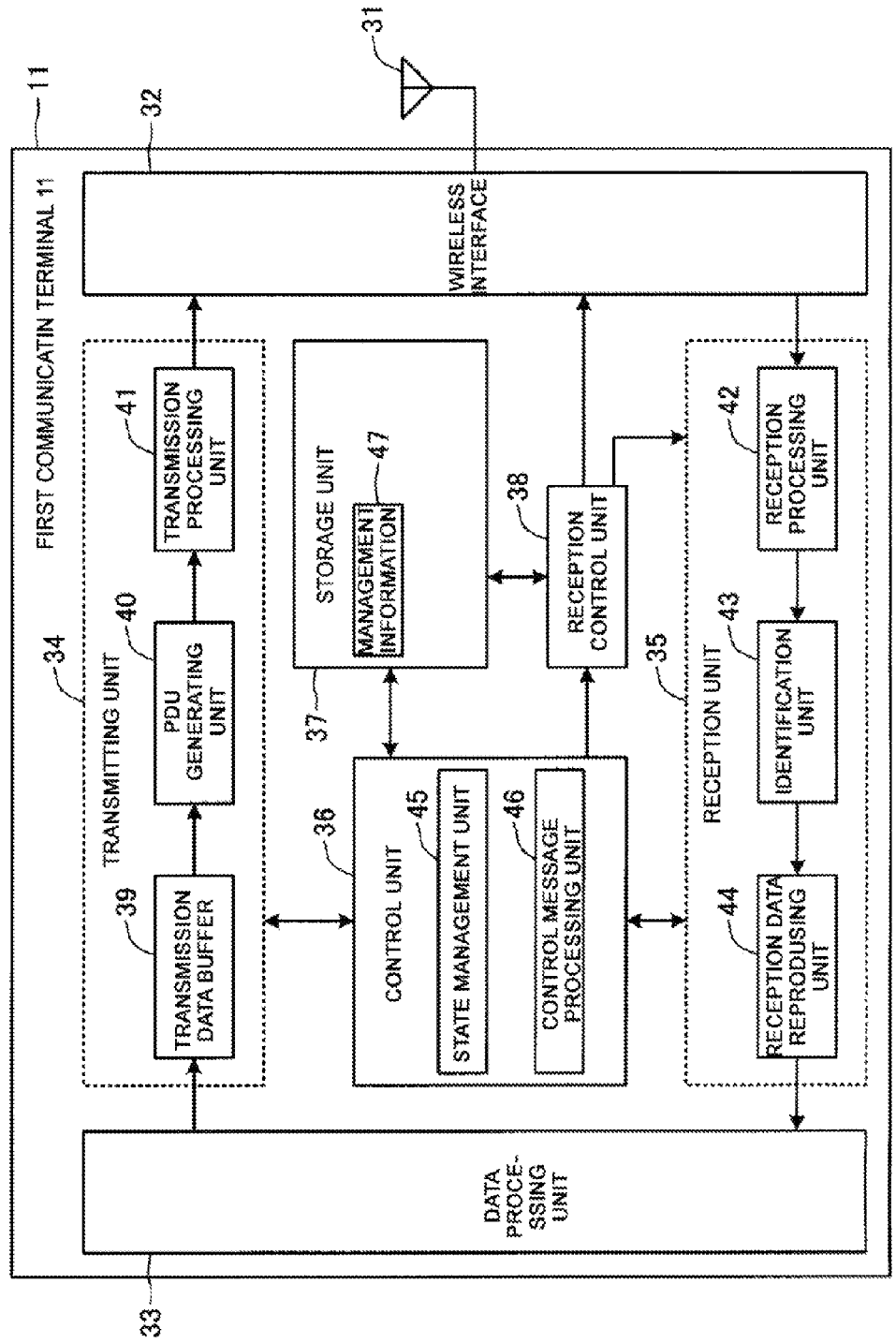
FIG. 20 depicts a block diagram of a terminal in accordance with the sixth embodiment of the present invention.

FIG. 20 depicts a block diagram of a first communication terminal 11 in accordance with a sixth embodiment. In the sixth embodiment, information regarding the associated communication terminals such as the second communication terminal 12 associated with the first communication terminal 11 as communication counterparts is not stored in the storage unit 37 but retained in the management device 15. While the overall configuration of the other components in the sixth embodiment such as the wireless communication system and the management device may be similar to the wireless communication system and the management device of the second embodiment, the management device 15 of the sixth embodiment retains the information of the associated communication terminals in its storage unit in advance. For example, referring back to FIG. 4 that illustrates the management device 15 of the second embodiment, the storage unit 21 of the sixth embodiment additionally stores information of the associated communication terminals obtained in advance. As a result, the information regarding the associated communication terminal 25 of the storage unit 21 is not included in the requesting message (e.g., DREG-REQ) sent from the first communication terminal 11 in the sixth embodiment. In contrast, the first communication terminal 11 of the second embodiment includes the information of the associated communication terminal 25 to the requesting message (e.g., DREG-REQ) as necessary.

Operation of Wireless Communication System

Figure 21:
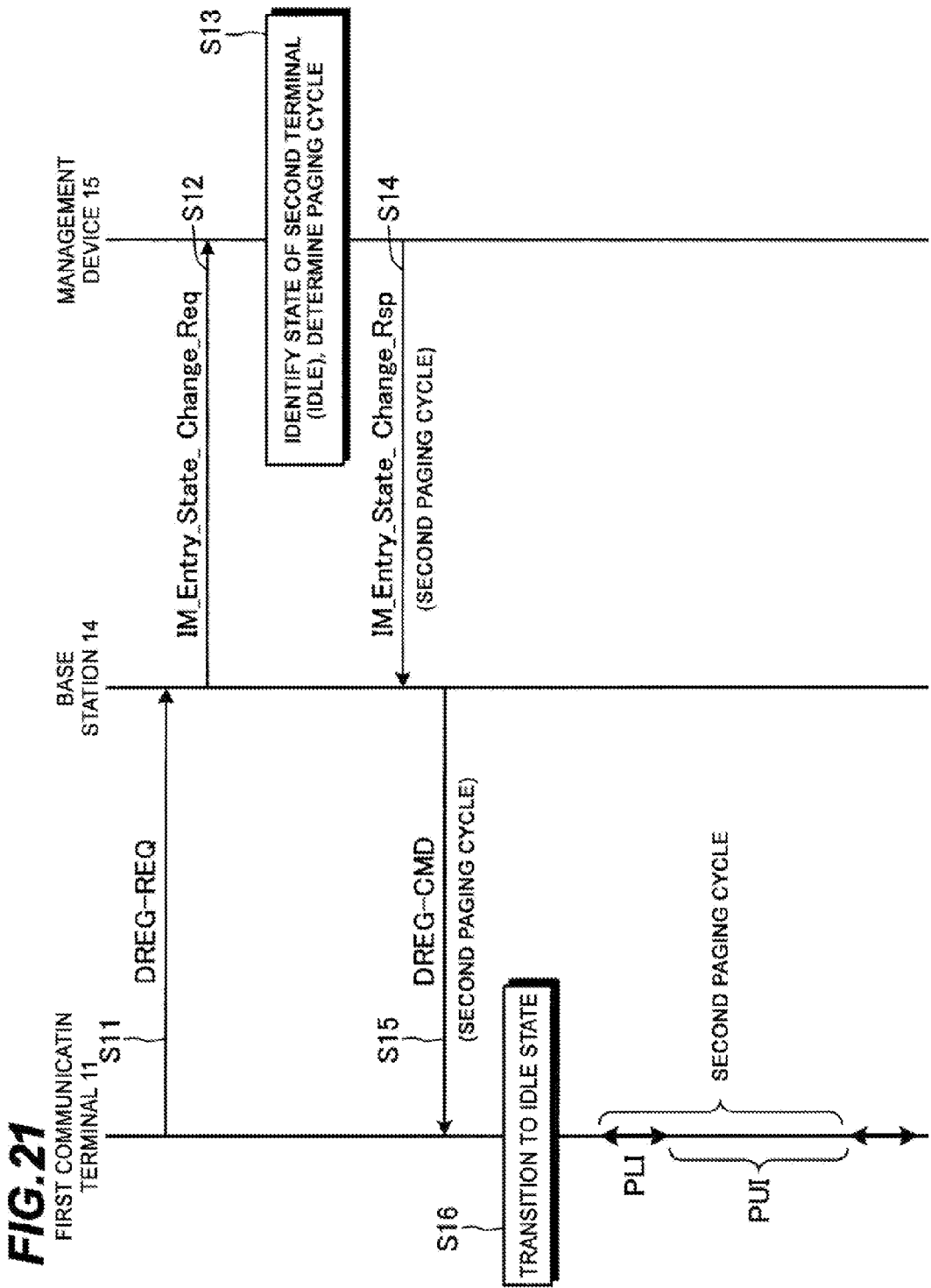
FIG. 21 illustrates a sequence diagram of a wireless communication system in accordance with the sixth embodiment of the present invention.

FIG. 21 illustrates a sequence diagram of a wireless communication system in accordance with the sixth embodiment of the present invention. As illustrated in the diagram, the first communication terminal 11 transmits a requesting message (e.g., DREG-REQ) to the base station 14, when the first communication terminal 11 is making a transition from a normal state to an idle state (step S11). As explained above, the DREG-REQ message in the sixth embodiment does not include information regarding the associated communication terminal (e.g., the second communication terminal 12). When the management device 15 receives a request message (e.g., IM_Entry_State_Change_Req) from the base station 14 (step S12), the management device 15 refers to the information of the associated communication terminal retained in the storage unit 21 stored in advance and identifies the associated communication terminal (e.g., the second communication terminal 12). Subsequently, the management device 15 further identifies the state of the second communication terminal 12 by referring to the idle state information of the second communication terminal 12 stored in the management information 24 of the storage unit 21, and determines the paging cycle of the first communication terminal 11 accordingly (step S13). The management device 15 then instructs the first communication terminal 11 to change the paging cycle into the determined one (step S14, S15). Subsequently, the first communication terminal 11 may make a transition to the idle state (step S16), and controls the PLI and PUI with the instructed paging cycle.

According to the sixth embodiment as described above, similar effect may be achieved as in the second embodiment even if the management device 15 (rather than the first communication terminal 11) retains the information regarding the associated communication terminal. Also, it is noted that when the associated communication terminal (e.g., the second communication terminal 12) in the sixth embodiment returns from the idle state to the normal state while the first communication terminal 11 is in the idle state, the paging cycle of the first communication terminal 11 may be changed into the first paging cycle as in the third embodiment.

Seventh Embodiment

Configuration of Communication Terminal

Figure 22:
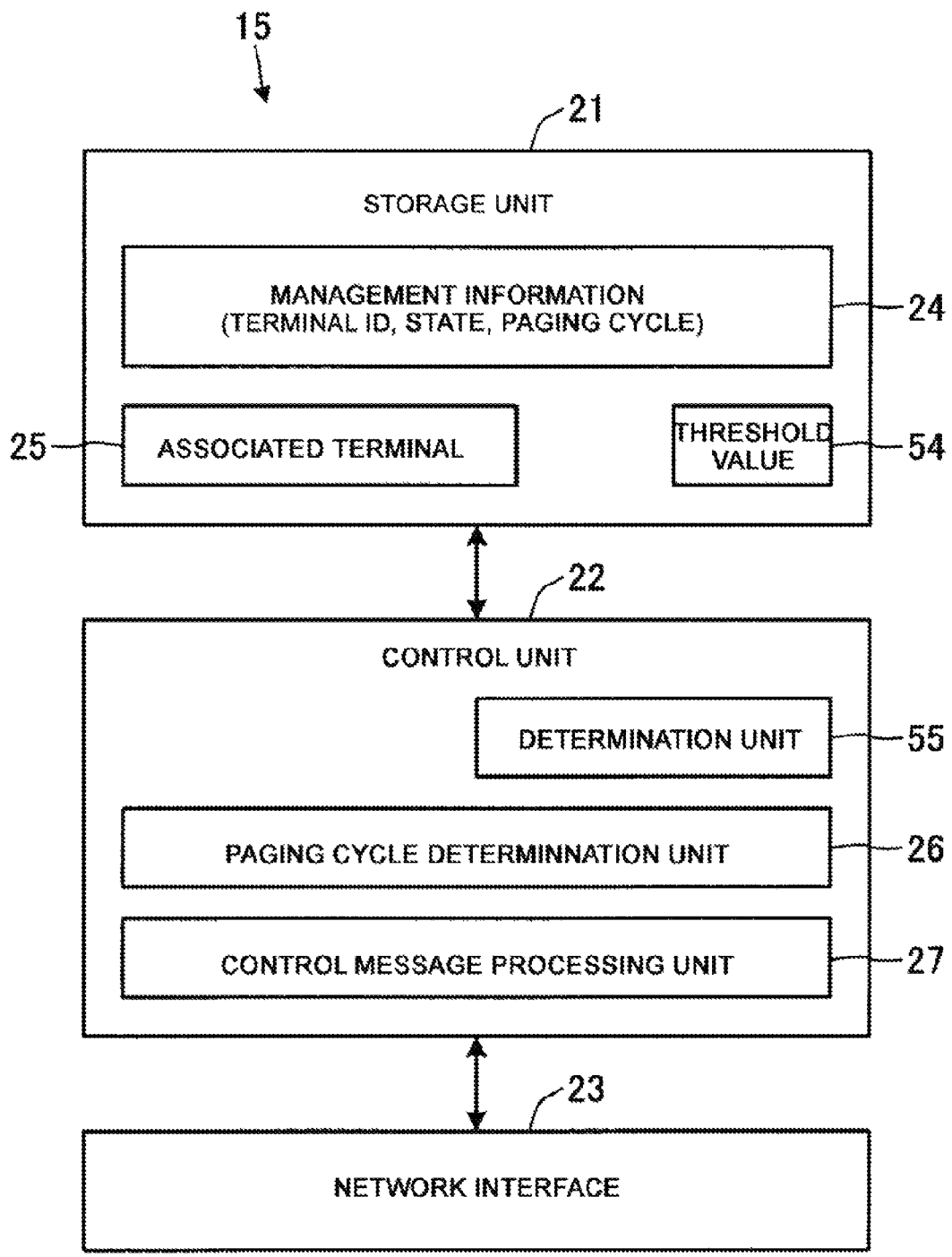
FIG. 22 depicts a block diagram of a management device in accordance with the seventh embodiment of the present invention.

FIG. 22 depicts a block diagram of a management device 15 in accordance with the seventh embodiment. In particular, the management device 15 of the seventh embodiment retains the information of a threshold value 54 in the storage unit 21 and performs a threshold value decision. Also it is noted that information regarding the associated communication terminals associated as communication counterparts is retained in the management device 15 in the seventh embodiment, and the configuration of the wireless communication system and the communication terminals may be similar to the wireless communication system and the communication terminals in the sixth embodiment.

Operation of Wireless Communication System

Figure 23:
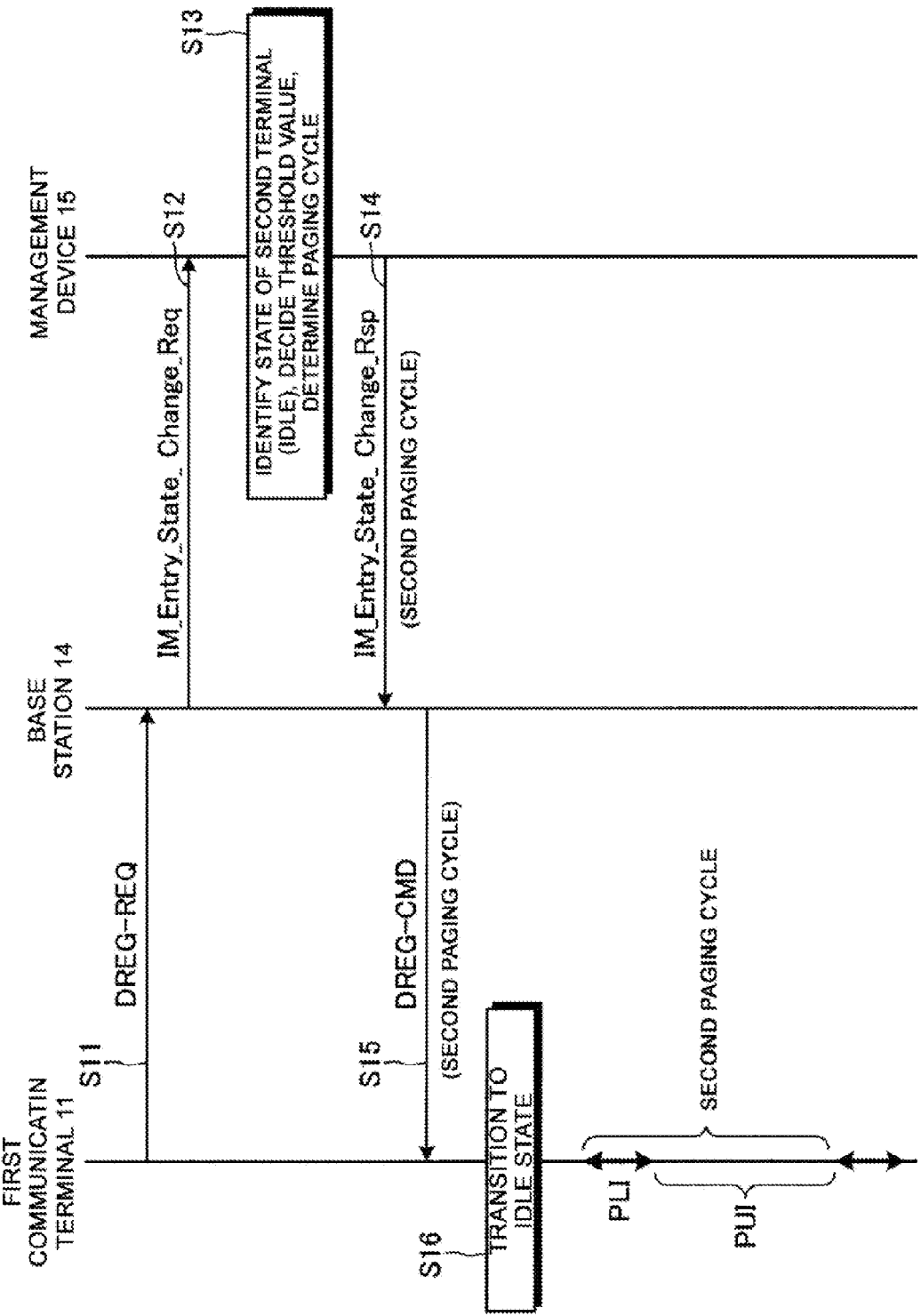
FIG. 23 illustrates a sequence diagram of a wireless communication system in accordance with the seventh embodiment of the present invention.

FIG. 23 illustrates a sequence diagram of a wireless communication system in accordance with the seventh embodiment. As illustrated in the diagram, upon receiving a state change request message (e.g., IM_Entry_State_Change_Req) from the base station 14 (step S12), the management device 15 identifies the associated communication terminals including the second communication terminal 12 associated with the first communication terminal 11 as communication counterparts by referring to the information at the associated communication terminal 25 retained at the storage unit 21 in advance. In addition, the management device 15 acquires the threshold value 54 retained in the storage unit 21 in advance and compares the number of the identified associated communication terminals and the threshold value.

If it is determined that the number of the associated communication terminals including the second communication terminal 12 does not exceed the threshold value, the management device 15 instructs the first communication terminal 11 to change the paging cycle into the second paging cycle, as explained in the second embodiment. If, however, it is determined that the number of the associated communication terminals including the second communication terminal 12 exceeds the threshold value, the management device 15 determines the paging cycle of the first communication terminal 11 to be the first paging cycle (step S13) and instructs the first communication terminal 11 accordingly (steps S14, S15). Upon receiving the instruction, the first communication terminal 11 makes a transition to the idle state (step S16), and controls the PLI and PUI with the instructed paging cycle, i.e., the first paging cycle.

Operation of Management Device

Figure 24:
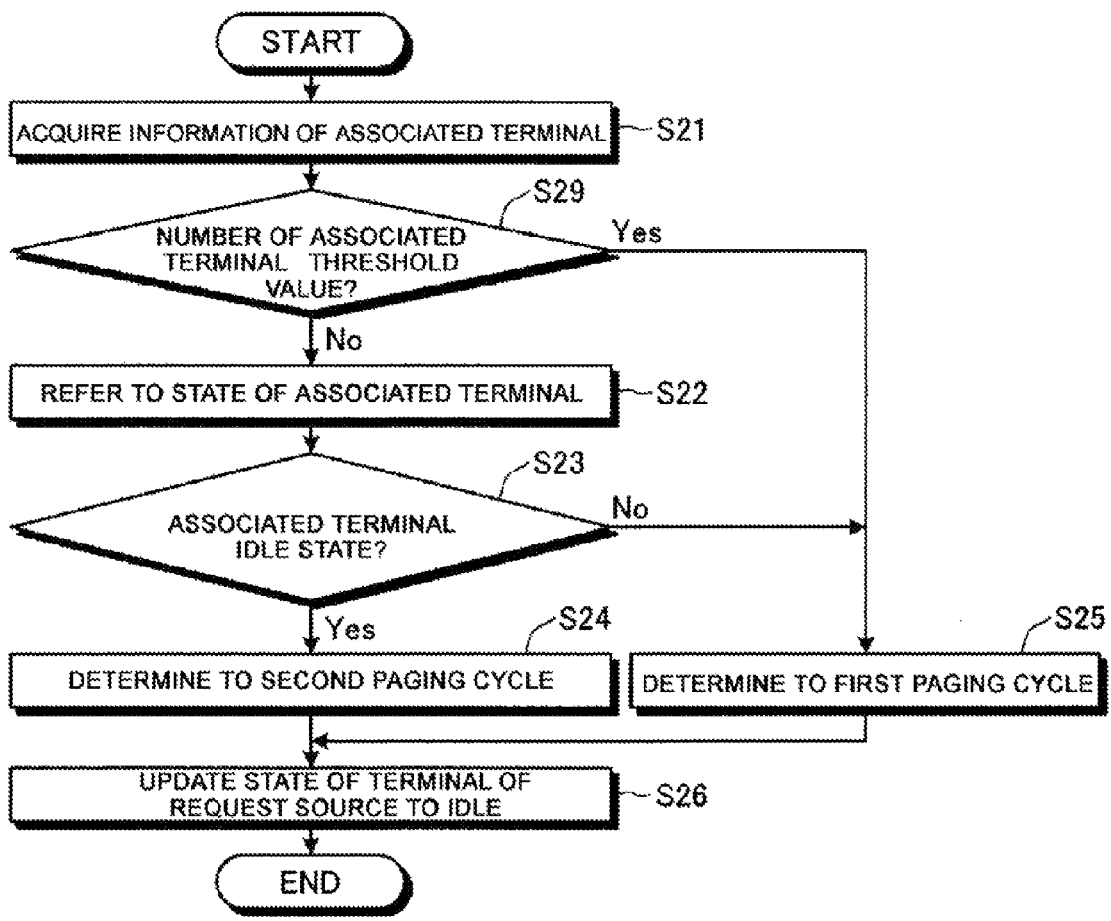
FIG. 24 is a flowchart of a management device in accordance with the seventh embodiment of the present invention.

FIG. 24 is a flowchart that illustrates a series of operations performed by the management device 15 in accordance with the seventh embodiment. First of all, the management device 15 acquires the information of the associated communication terminals including the second communication terminal 12 (step S21). Subsequently, if it is determined that the number of the associated communication terminals including the second communication terminal 12 exceeds the threshold value (step S29: Yes), the management device 15 determines the paging cycle of the first terminal 11 to be the first paging cycle (step S25). If, however, it is determined that the number of the associated communication terminals including the second communication terminal 12 does not exceed the threshold value (step S29: No), the management device 15 determines the paging cycle of the first communication terminal 11 to be the second paging cycle (step S24).

According to the seventh embodiment of the present invention as described above, the similar effect may be achieved as in the fourth embodiment even if the management device 15 retains the threshold value information 54 in the storage unit 21. Also, it is noted that when the associated communication terminal (e.g., the second communication terminal 12) in the seventh embodiment returns to the normal state from the idle state while the first communication terminal 11 is in the idle state, the paging cycle of the first communication terminal 11 may be changed into the first paging cycle as in the third embodiment.

Eighth Embodiment

Configuration of Wireless Communication System

Figure 25:
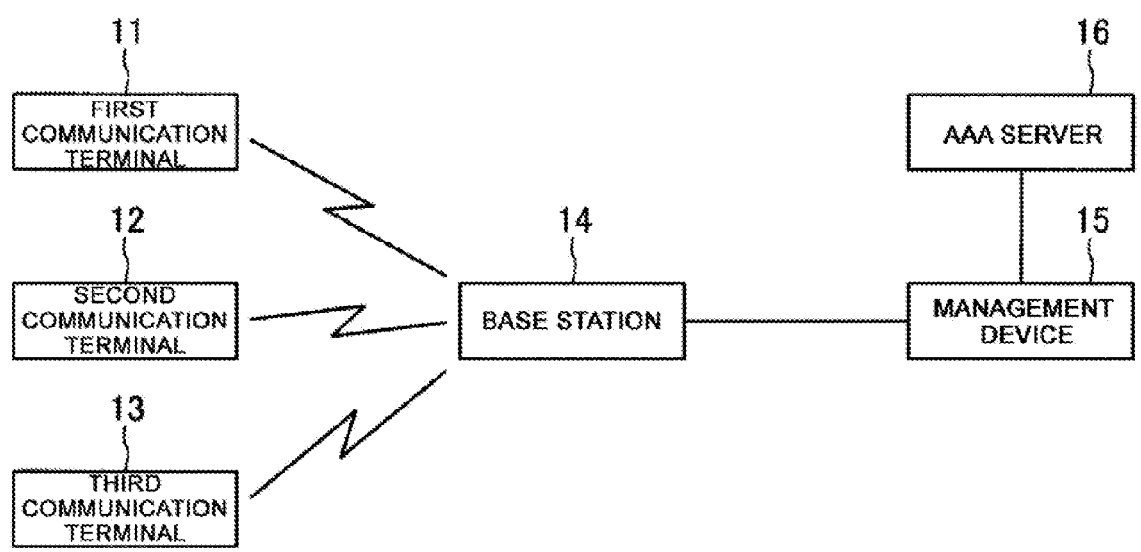
FIG. 25 depicts a block diagram of a wireless communication system in accordance with the eighth embodiment of the present invention.

FIG. 25 depicts a block diagram of a wireless communication system in accordance with an eighth embodiment. The wireless communication system of the eighth embodiment includes a first communication terminal 11, a second communication terminal 12, a third communication terminal 13, a base station 14 and a management device 15 similar to the second embodiment as illustrated in FIG. 3. In particular, the wireless communication system of the eighth embodiment further includes an Authentication Authorization Accounting (AAA) server 16 configured to provide the management device 15 with information regarding the associated communication terminals associated with the first communication terminal 11 as communication counterparts, i.e., the management device 15 acquires information regarding the associated communication terminals from the AAA server 16 in the eighth embodiment.

Configuration of AAA Server

Figure 26:
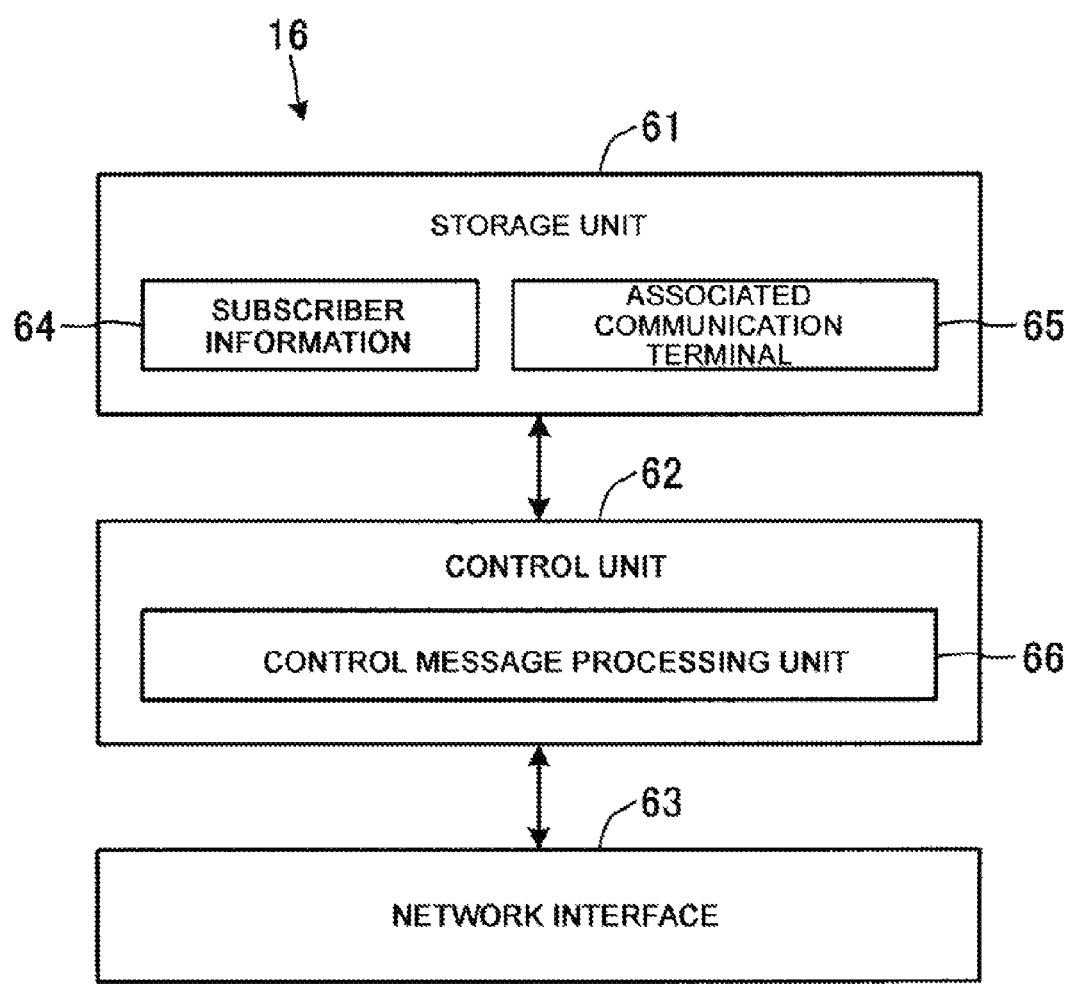
FIG. 26 depicts a block diagram of an AAA server in accordance with the eighth embodiment of the present invention.

Referring to FIG. 26 which depicts a block diagram of the AAA server 16 in accordance with the eighth embodiment, the AAA server 16 includes a storage unit 61, a control unit 62 and a network interface 63. The storage unit 61 of the AAA server 16 retains information regarding subscriber stored at the subscriber information 64 as well as information regarding the associated communication terminals stored at the associated communication terminal 65. The information regarding the associated communication terminal 65 may include, e.g., the information of the second communication terminal 12. The control unit 62 of the AAA server 16 notifies the management device 15 of the information regarding the associated communication terminals by referring to the associated communication terminal 65 at the storage unit 61, in response to the inquiry from the management device 15. The control unit 62 of the AAA server 16 includes a control message processing unit 66 that either interprets the inquiry message from the management device 15, or generates the notification message for the management device 15 depending on the operation status. The network interface 63 interfacing with a base station 14, a management device 15 and a higher level network transmits and receives data by communicating with these network components.

Operation of Wireless Communication System

FIG. 27 illustrates a sequence diagram of the wireless communication system in accordance with the eighth embodiment. As illustrated in the diagram, upon receiving a state change request message (e.g., IM_Entry_State_Change_Req) from the base station 14 (step S12), the management device 14 requests information regarding the associated communication terminals to the AAA server 16 (step S53). In response, the AAA server 16, by referring to the information stored in the associated terminal 65 of the storage unit 61, identifies the associated communication terminal (e.g., the second communication terminal 12) associated with the first communication terminal 11 as a communication counterpart and notifies the management device 15 of the identified result (step 54). Upon receiving the identified result from the AAA server 16, the management device 15 further identifies the state of the associated second communication terminal 12, and determines the paging cycle of the first communication terminal 11 accordingly (step S13). The management device 15 then instructs the determined paging cycle to the first communication terminal 11 (steps S14, S15) via the base station 14, and the first communication terminal 11, upon receiving the determined paging cycle via the base station 14, makes a transition to the idle state (step S16) and controls the PLI and PUI according to the instructed paging cycle.

According to the eighth embodiment as described above, even if the first communication terminal 11 and the management device 15 do not retain the information regarding the associated communication terminals, the similar effect may be achieved as in the second embodiment, e.g., by acquiring the information regarding the associated communication terminals from a third party device such as the AAA server 16. Also, in the eighth embodiment, when the associated communication terminal (e.g., the second communication terminal 12) returns to the normal state from the idle state while the first communication terminal 11 is in the idle state, the paging cycle of the first communication terminal 11 may be changed into the first paging cycle as in the third embodiment, or the first communication terminal 11 may perform a threshold value decision as in the seventh embodiment.

In general, one of the aspects of the present invention describes a wireless communication system that identifies the state of a second communication terminal associated with a first communication terminal as a communication counterpart when the first communication terminal make a transition from a first operation state (e.g., a normal state) to a second operation state (e.g., an idle state). Subsequently, the first communication terminal changes the intermittent reception period into a second operation period set to be longer than an existing first operation period, based on the identified state of the associated second communication terminal. As a result, an overall power consumption at the first communication terminal may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been illustrated in detail, it should be understood that the various changes, substitutions, and alterations could be made hereto without departing from the spirit and scope of the invention.

What is claimed is:

1. A management device in a wireless communication system including a first communication terminal and a second communication terminal associated with the first communication terminal as a communication counterpart, the management device comprising:
a storage unit that stores information regarding an operation state of a communication terminal; and
a control unit that identifies the operation state of the associated second terminal based on the information stored in the storage unit, and changes an intermittent reception period of the first communication terminal into a longer period than an existing period, based on the identified operation state of the second communication terminal.

2. The management device according to claim 1, wherein the control unit changes the intermittent reception period of the first communication terminal to be longer than the existing period when the second communication terminal is in an idle state.

3. The management device according to claim 1, wherein there exists at least two associated second communication terminals, and the control unit determines the intermittent reception period of the first communication terminal based on number of the associated second communication terminals and a predetermined threshold value.

4. The management device according to claim 1, wherein the control unit changes the intermittent reception period of the first communication terminal from the longer period to the existing period, in response to a request from the associated second terminal whose operation state has been identified when the first communication terminal changes the intermittent reception period into the longer period than the existing period in response to the request from the first communication terminal.

5. The management device according to claim 1, further comprising a secondary storage unit to retain information of the associated second communication terminal.

6. A communication method in a wireless communication system including a first communication terminal and a second communication terminal associated with the first communication terminal as a communication counterpart, the communication method comprising:
receiving a transition request from the first communication terminal requesting a transition from a first operation state to a second operation state;
identifying an operation state of the second communication terminal in response to the transition request from the first communication terminal; and
changing an intermittent reception period of the first communication terminal into a longer period than an existing period based on the operation state of the second communication terminal identified at the identifying.

7. The communication method according to claim 6, further comprising changing the intermittent reception period of the first communication terminal into the longer period than the existing period when the operation state of the second communication terminal is in an idle state.

8. The communication method according to claim 6, further comprising determining the intermittent reception period of the first communication terminal based on number of the second communication terminal and a predetermined threshold value.

9. The communication method according to claim 6, further comprising changing the intermittent reception period of the first communication terminal from the longer period into the existing period set prior to the transition request in response to a request from the second communication terminal whose operation state has been identified when the first communication terminal changes the intermittent reception period into the longer period than the existing period after a management device determines the intermittent reception period of the first communication terminal in response to the transition request from the first communication terminal.

10. The communication method according to claim 6, further comprising changing the intermittent reception period of the first communication terminal into the longer period than the existing period based on a response from a management device.

* * * * *